US008521934B1

United States Patent
Ni

(10) Patent No.: US 8,521,934 B1
(45) Date of Patent: Aug. 27, 2013

(54) MULTI-PORT CONTEXT-BASED HOST CONTROLLER

(75) Inventor: Jie Ni, Portland, OR (US)

(73) Assignee: Fresco Logic, Inc., Beaverton, OR (US)

( * ) Notice: Subject to any disclaimer, the term of this patent is extended or adjusted under 35 U.S.C. 154(b) by 303 days.

(21) Appl. No.: 13/035,875

(22) Filed: Feb. 25, 2011

Related U.S. Application Data

(60) Provisional application No. 61/307,899, filed on Feb. 25, 2010, provisional application No. 61/307,907, filed on Feb. 25, 2010.

(51) Int. Cl.
G06F 13/362 (2006.01)
G06F 13/20 (2006.01)

(52) U.S. Cl.
USPC ............ 710/113; 710/105; 710/110; 710/313

(58) Field of Classification Search
USPC .......................................... 710/110, 113, 313
See application file for complete search history.

(56) References Cited

U.S. PATENT DOCUMENTS

| | | | | |
|---|---|---|---|---|
| 5,933,611 | A * | 8/1999 | Shakkarwar | 710/100 |
| 6,484,218 | B1 * | 11/2002 | Pipho | 710/32 |
| 6,708,233 | B1 * | 3/2004 | Fuller et al. | 710/22 |
| 6,775,733 | B2 * | 8/2004 | Chang et al. | 710/313 |
| 7,490,255 | B2 * | 2/2009 | Diefenbaugh et al. | 713/320 |
| 7,865,653 | B2 * | 1/2011 | Zhang et al. | 710/308 |
| 7,917,671 | B2 * | 3/2011 | Chilukoor et al. | 710/38 |
| 2007/0208895 | A1 * | 9/2007 | Chang et al. | 710/110 |
| 2011/0208891 | A1 * | 8/2011 | Meyers | 710/313 |
| 2011/0208892 | A1 * | 8/2011 | Meyers | 710/313 |
| 2012/0166692 | A1 * | 6/2012 | Wang et al. | 710/105 |

OTHER PUBLICATIONS

U.S. Appl. No. 61/446,913, filed Feb. 25, 2010.
Intel Corp., Extensible Host Controller Interface (xHCI) Specification for USB 3.0, Ch. 3, May 21, 2010, available at http://www.intel.com/technology/usb/xhcispec.htm.

* cited by examiner

Primary Examiner — Brian Misiura
(74) Attorney, Agent, or Firm — Stoel Rives LLP

(57) ABSTRACT

A host controller for a bus is disclosed. The host controller includes a plurality of functional modules interconnected to manage transfer of data between a host bus and a root hub configured to communicate with one or more USB device endpoints on the bus. The plurality of functional modules comprises a DMA engine to transfer one or more data payloads between the host bus and the root hub, a transfer manager configured to determine what control data and/or data payloads should be transferred, and a scheduler to schedule actions performed by the transfer manager. A plurality of control memories, each associated with one or more of the functional modules, store state and/or data information fields accessible by its one or more associated functional modules. The plurality of control memories are distinct and independently accessible from one another.

21 Claims, 18 Drawing Sheets

| Row | Transfer Manager Context Fields | Width (Bits) | Description |
|---|---|---|---|
| 1102 | Transfer Dequeue Pointer | 60 | Current transfer ring dequeue pointer for processing by the transfer engine 910 |
| 1104 | Completion Dequeue Pointer | 60 | Current transfer ring dequeue pointer for processing by the completion engine 920 |
| 1110 | Transfer Cycle Bit | 1 | Cycle bit for current transfer ring for processing by the transfer engine 910 |
| 1112 | Completion Cycle Bit | 1 | Cycle bit for current transfer ring for processing by the completion engine 920 |
| 1120 | Data Buffer Pointer | 64 | Pointer associated with a current TRB the transfer engine 910 processes, pointing to the start of available data buffer space in the memory 125 |
| 1122 | Data Buffer Offset | 17 | Remaining portion of data buffer (size of zero indicates transfer complete) of a current TRB that the transfer engine 910 is processing |
| 1124 | TRB Pending | 1 | Status indicating whether the transfer engine 910 has completely processed a current TRB |
| 1126 | TD Length | 24 | Amount of data transferred in current TD |
| 1130 | Remote Flow Control Flag | 1 | Device buffer full and device is in a flow control condition |
| 1132 | Internal Flow Control Flag | 1 | Internal resources are limited (buffer full for port FIFO, DMA engine buffer full, etc.) such that an endpoint is in a flow control condition |
| 1140 | Endpoint NPKT | 5 | NPKT field received from device response packet |
| 1142 | Current Bursted NPKT | 5 | Number of packets transmitted in fly. It is used to resolve how many more packets can be sent |
| 1150 | Control Endpoint Direction | 1 | Flow control bit indicating transfer direction of a control endpoint |
| 1160 | Resend after NYET | 1 | Flag indicating resend all packets transmitted subsequent to a NYET response |
| 1162 | Resend after NAK | 1 | Flag indicating resend all packets transmitted subsequent to a NAK response |
| 1170 | ISP Flush | 1 | Flag indicating endpoint has a short packet so flush remaining transfer TRBs |
| 1172 | Error Flush | 1 | Flag indicating endpoint is in an error state so flush remaining TRBs |
| 1180 | TRB Length Offset | 17 | Current processed length of the TRB that the completion engine 920 is processing |
| 1182 | IOC | 1 | Flag to indicate that an event should be generated when a current TRB is completely processed and received by a device |
| 1184 | ISP | 1 | Flag to indicate an event should be generated when a short packet is received |
| 1186 | TRB Type | 2 | Type of TRB (e.g. Link TRB, Normal TRB, etc.) |
| 1188 | Chain | 1 | Indicates a subsequent TRB in a transfer ring is part of the same TD |
| 1190 | Local TRB Cache Write Pointer | 3 | Pointer to local cache location for writing a new TRB |
| 1192 | Local TRB Cache Read Pointer | 3 | Pointer to local cache location for updating a processed TRB |

Figure 11

| Row | Scheduler Context Fields | Width (Bits) | Description |
|---|---|---|---|
| 1302 | Endpoint State | 3 | Endpoint state information (EP State) of an endpoint context |
| 1304 | Mult. | 2 | Mult field of an endpoint context |
| 1306 | Interval | 4 | Service interval of an endpoint context |
| 1308 | Error Count | 3 | Error count value of an endpoint context |
| 1310 | Endpoint Type | 2 | EP Type field of an endpoint context |
| 1312 | Max Burst Size | 4 | Max burst size of an endpoint context |
| 1314 | Max Packet Size | 11 | Max packet size of an endpoint context |
| 1316 | Max ESIT Payload | 16 | Max Endpoint Service Time Interval Payload value of an endpoint context |
| 1318 | Internal Asynchronous Delay | 4 | Delay between asynchronous packets |

Figure 13

| Row | DMA Context Fields | Width (Bits) | Description |
|---|---|---|---|
| 1602 | ACK Sequence Number | 5 | Sequence number of the expected received packet |
| 1604 | XMT Sequence Number | 5 | Sequence number of the next transmitted packet |
| 1608 | IN Endpoint Number of Packet Count | 5 | Number of packets the transfer manager 225 sent to the DMA engine 190 and the DMA engine has yet to receive an ACK for |
| 1610 | Short Packet | 2 | Short packet identifier |
| 1612 | NRDY Flag | 1 | NRDY received flag |

Figure 16

| Row | Slot Context Fields | Width (Bits) | Description |
|---|---|---|---|
| 1702 | Route String | 20 | The actual routing information of the USB3 packet |
| 1704 | Max Exit Latency | 16 | Max exit latency field of the slot context |
| 1706 | Root Hub Port Number | Scalable | The root hub port number of the slot context |
| 1708 | USB Device Address | 8 | Device address field of the slot context |
| 1710 | Speed | 2 | Device speed field of the slot context |
| 1712 | Multi-TT | 1 | Indicates current slot has multiple transaction translator interfaces |
| 1714 | TT Port Number | 8 | TT port number of the slot context |
| 1716 | TT Hub Slot ID | 8 | TT slot number field |

MULTI-PORT CONTEXT-BASED HOST CONTROLLER

RELATED APPLICATIONS

This application is a nonprovisional of and claims the benefit under 35 U.S.C. §119(e) of U.S. Provisional Patent Application No. 61/307,899, filed Feb. 25, 2010, and U.S. Provisional Patent Application No. 61/307,907, filed Feb. 25, 2010, both of which are hereby incorporated by reference in their entireties.

TECHNICAL FIELD

The field of this disclosure relates generally to serial bus data transfer and, in particular, to a host controller in such a bus environment.

BACKGROUND

Various interfaces have been designed to facilitate data exchange between a host system (e.g., computer) and peripheral devices, such as keyboards, scanners, and printers. One common bus-based interface is the Universal Serial Bus (USB), which is a polled bus in which the attached peripherals share bus bandwidth through a host-scheduled, token-based protocol.

A host controller controls transmission of packets on a bus and thereby facilitates data transfer between the host system and connected peripheral devices. A host controller interacts with the host system using a host bus, and interacts with the peripheral (or networked) devices using a bus-based interface protocol including, for example, USB, SCSI, Fibre Channel, eSATA IDE, Ethernet, and FireWire, etc. A USB host controller typically resides in the host system and transmits or directs the receipt or transmission of USB packets to or from connected USB device endpoints. When multiple peripheral devices are connected on the bus, the host controller arbitrates access and allocates available bus bandwidth among the connected devices. Host controllers that quickly and efficiently allocate bus resources between multiple connected devices may increase data throughput performance.

BRIEF DESCRIPTION OF THE DRAWINGS

FIG. 11 is a table of control memory fields for a transfer manager, according to one embodiment.

FIG. 13 is a table of control memory fields for a scheduler, according to one embodiment.

FIG. 16 is a table of control memory fields for a DMA engine, according to one embodiment.

FIG. 17 is a table of memory fields for a slot context, according to one embodiment.

DETAILED DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in light of this disclosure, certain embodiments may be capable of achieving certain advantages, including some or all of the following: (1) a host controller implementing an extensible host controller interface for USB 2.0/3.0 protocols; (2) a host controller having functional modules and internal control memories facilitating a scalable and flexible hardware core; (3) interconnections between functional modules and control memories that facilitate concurrent, i.e., multi-threaded, endpoint task processing; (4) an architecture that can scale for multiple ports and individually control the power consumptions and performance allowance of each port; (5) an architecture that can facilitate bandwidth and power management in control of USB 2.0/3.0 functionalities; (6) an architecture that can facilitate low power on/off and port FIFO (first-in, first-out buffer) sizing that is all individually controllable and scalable. These and other advantages of various embodiments will be apparent upon reading this document.

Figure 1:
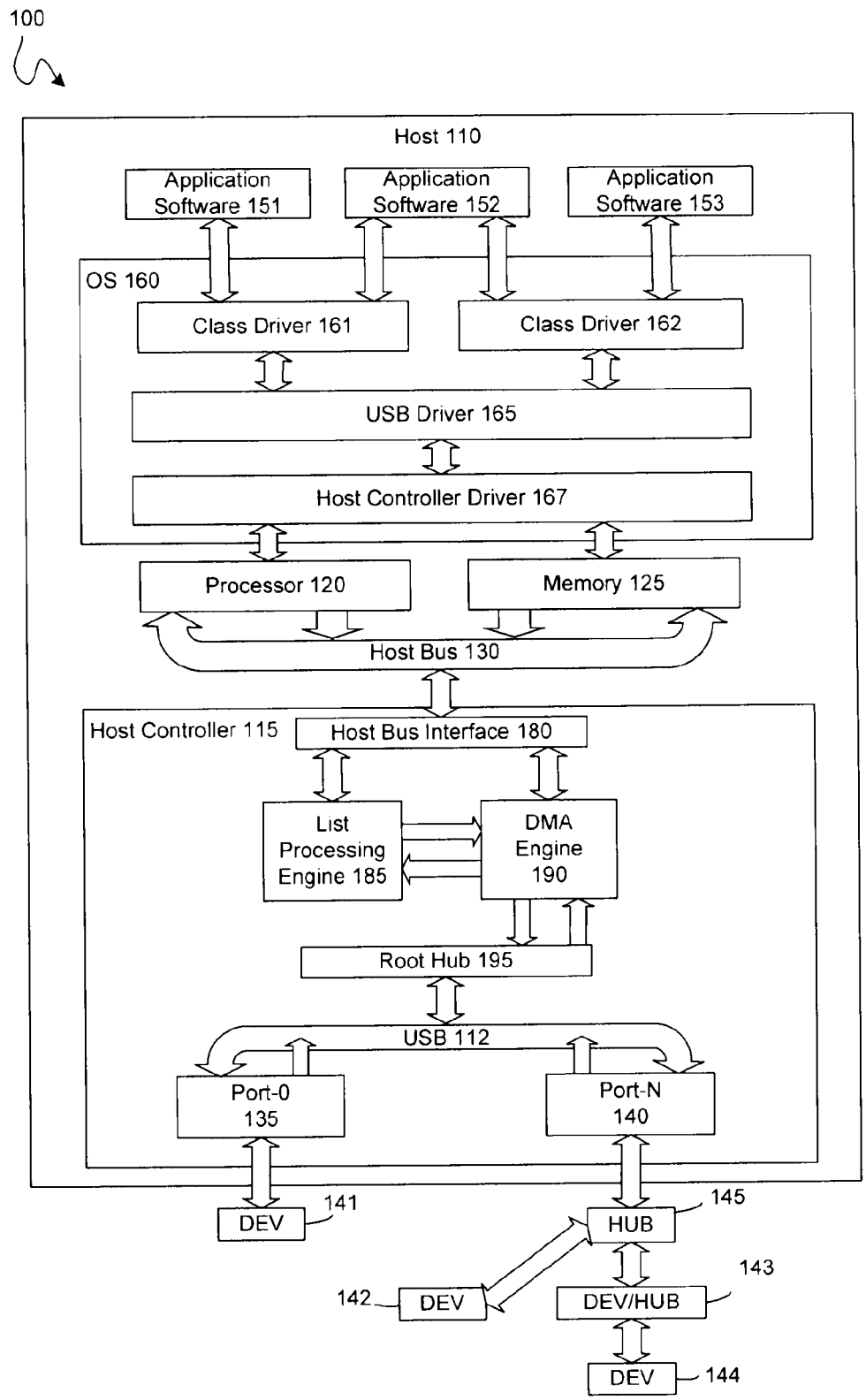
FIG. 1 is a block diagram illustrating a plurality of devices attached to a host, according to one embodiment using USB.

FIG. 1 is a hardware and software block diagram depicting an example system 100 having a plurality of devices attached to a host 110 via a bus 112, according to one embodiment using USB. As described herein, a host controller 115 in the host 110 contains functional modules and associated control memories with interconnections that facilitate multi-threaded endpoint task processing between the host and the plurality of device endpoints, i.e., uniquely addressable bus locations on a connected device that provide a source or sink of data between the host 110 and a connected device.

In the example system 100, the host 110 may be any computing device, such as a general-purpose computer, personal computer, embedded system (e.g., a system that is embedded into a device and is designed to perform dedicated functions or tasks), or other device (e.g., mobile phone, smart phone, or set-top box). The host 110 performs several functions, such as detecting the attachment and removal of devices (e.g., peripheral USB devices, hub devices, etc.), managing control and data flow between the host 110 and various devices, collecting status and activity statistics, and providing power to attached devices. The host 110 includes several hardware components: the host controller 115, a processor 120, and a memory 125 that are all connected via a host bus 130. The host bus 130 may be, for example, any of the following alternatives: a peripheral component interconnect express (PCIe) bus, an advanced microcontroller bus architecture (AMBA) high-performance bus (AHB), an AMBA advanced trace bus (ATB), or a CoreConnect bus, or other communication mechanism, such as direct connections of a serial, parallel, or other type.

The processor 120 may be any form of digital processor, such as a general-purpose microprocessor or a digital signal processor (DSP), for example. The processor 120 may be readily programmable; hard-wired, such as an application specific integrated circuit (ASIC); or programmable under special circumstances, such as a programmable logic array (PLA) or field programmable gate array (FPGA), for example. Program memory for the processor 120 may be integrated within the processor 120, may be part of the memory 125, or may be an external memory. In the example system 100, the processor 120 is connected to the memory 125 and executes software therein.

The memory 125 may comprise any suitable machine-readable medium, such as random access memory (RAM), read only memory (ROM), flash memory, and EEPROM devices, and may also include magnetic or optical storage devices, such as hard disk drives, CD-ROM drives, and DVD-ROM drives. In certain embodiments, the host controller 115 may access shared memory from the host 110 in which the memory 125 (e.g., RAM) is shared between the host controller 115 and the processor 120. In addition, or alternatively, an interface may be coupled to the host bus 130 so that memory 125 or another memory, such as flash memory or a hard disk drive, are accessible locally or accessible remotely via a network.

Additional hardware in the example host 110 includes a port (Port-0) 135 and a port (Port-N) 140, to which USB devices may be attached. For sake of clarity, the host 110 has two ports 135, 140; however, skilled persons will appreciate that more or less ports are possible. In the example system 100, the processor 120 communicates with attached devices via the host controller 115, through associated ports 135 and 140. Some devices, such as USB audio speakers 141, are directly connected to the host 110 via the port 135. Other devices, such as a USB printer device 142, a USB keyboard and internal hub device 143, or a USB mouse 144, communicate to the host 110 via an intermediate hub device 145 connected to the port 140. The number of ports need not be two, as depicted in FIG. 1, but may be any general number N+1, where N≧0.

The host 110 interacts with devices 141-145 through the host controller 115, which functions as an interface to the host 110 and allows for two-way communication with the attached devices (e.g., the devices 141-145). Various devices may be coupled to the host 110 via the host controller 115, as indicated above. Other devices that may be coupled to the host controller 115 include, for example, cameras, MP3 players, scanners, and various input devices such as a pen and tablet and a trackball. Although only one host controller 115 is illustrated in FIG. 1, multiple host controllers may be included in the host 110. In addition, each of the devices 141-145 may serve as a hub for other devices. For example, the keyboard 143 provides hub functionality so that the mouse 144 can be coupled to the host 110 via the hub within the keyboard 143. Further, external hubs, such as the hub 145, may be coupled to the host controller 115.

The processor 120 executes software programs to control the operation of various system internal hardware components and attached devices, to transfer data between components via host bus 130, to associate data from the various components together, to perform calculations using stored data in the memory 125, to otherwise manipulate data, and to present results to users. The processor 120 executes application software 151, 152, 153 to manage user-space software requests. The application software 151, 152, 153 generates requests that are handled by an operating system (OS) 160 software program that manages the various interactions between hardware components and host 110 software. For managing USB, the OS 160 dispatches specific class drivers (or device drivers) to handle certain classes of USB tasks, e.g., mass storage, audio, human interface, etc. The OS 160 and associated application software 151, 152, 153 programs may be stored in an external memory that is accessible to the host 110, and loaded into the memory 125 during runtime initialization.

The example OS 160 includes device drivers that are stored in the memory 125 during execution, serving as the interface between the OS 160 and the various hardware components that may be included in the host 110. For example, a display driver, network interface, and input/output controller may be included as hardware components in the host 110 and thus require device drivers. In the example system 100, USB class drivers 161 and 162 issue requests to a USB driver 165 via I/O Request Packets (IRPs). IRPs initiate a transfer between the host 110 and a particular device endpoint. For example, the USB class driver 161 for the USB keyboard 143 initiates an interrupt transfer by establishing an IRP and then supplying a memory buffer in the memory 125 into which keystroke data will be returned from the USB keyboard 143. Data may be stored in a buffer in the memory 125 or in another memory that is accessible to the host 110. Depending on the particular endpoint, data may include audio output data destined for the USB speaker device 141 or print data destined for the USB printer device 142, for example.

The example USB driver 165 provides a software interface between the USB class drivers 161 and 162, and the host controller 115 hardware that executes the data transaction. The USB driver 165 first determines the characteristics for each endpoint of an attached USB device, and then translates requests from the USB class drivers 161 or 162 into transactions for the characterized endpoints. For example, some endpoints are characterized as isochronous, requiring a specific amount of data throughput during each frame of a USB transaction, while other devices may require periodic access. When a user enables a new device on the host 110, the USB driver 165 detects the endpoint characteristics by parsing device descriptors during the device configuration. After configuration, whenever the USB driver 165 receives an IRP from the USB class drivers 161, 162 associated with a particular endpoint, the USB driver 165 organizes the request into individual transactions that are executed by the host controller 115.

A USB host controller driver 167 is a software module that executes on the host 110 and creates a linked list of data structures called transfer descriptors. The transfer descriptors are stored in the memory 125 and define transactions that the host controller 115 subsequently schedules for transmission based on available bus 112 resources, endpoint characteristics, and device driver requirements. For each endpoint, a separate linked list defines the sequence of transactions to be performed whenever there is available USB bus bandwidth (for asynchronous endpoints), or during each frame or microframe (for periodic endpoints). The USB host controller driver 167 is also responsible for setting up locations in the memory 125 for posting completion information. A success or error completion status provides a hardware interface that the USB host controller driver 167 uses to respond to the USB driver 165.

The host controller 115 includes a host bus interface 180, a list processing engine 185, a DMA engine 190, and a root hub 195. The host bus interface 180 is a register-level interface that enables the host controller 115 to communicate with the USB host controller driver 167. The host bus interface 180 preferably implements the eXtensible Host Controller Interface (xHCI) for USB Specification, Revision 1.0, May 21, 2010, (referred to herein as the "xHCI specification"), available from Intel, Corp. at http://www.intel.com/technology/usb/xhcispec.htm. The host bus interface 180 may optionally include an external or internal arbiter to negotiate contention between the DMA engine 190 and the list processing engine 185. The list processing engine 185 is a hardware state machine that implements functional modules to schedule and execute transactions during a given service interval, as discussed in further detail below. The root hub 195 is directly attached to or embedded in the host controller 115 and includes one or more root ports, such as root ports 135 and 140 discussed previously. The root hub 195 provides much of the same functionality as an externally connected hub, such as the hub 145, but the root hub 195 is integrated within the host 110 and the hardware and software interface between the root hub 195 and the host controller 115 is defined by the specific hardware implementation.

The host controller 115 may be implemented in any combination of hardware, firmware, or software. According to one embodiment, the host controller 115 implements a USB protocol, such as one or more of USB 1.0 described in USB Specification Revision 1.1, dated September 1998; USB 2.0 described in USB Specification Revision 2.0, dated Apr. 27, 2000; and USB 3.0 described in USB 3.0 Specification Revision 1.0, dated Nov. 12, 2008, all of which are available from USB Implementers Forum, Inc. at http://www.usb.org/developers/docs/. According to other embodiments, the host controller 115 implements other protocols, such as a future USB version or another protocol that imposes a tiered ordering on a star topology to create a tree-like configuration.

Hosts according to other embodiments may have less than all of the components illustrated in FIG. 1, may contain other components, or both. For example, the host 110 may include a number of other components that interface with one another via the host bus 130, including a display controller and display device, an input controller, and a network interface. The display controller and display device may be provided to present data, menus, and prompts, and otherwise communicate with a user via one or more display devices. The network interface may be provided to communicate with one or more hosts or other devices. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet). A wireless connection may use low or high powered electromagnetic waves to transmit data using any wireless protocol, such as Bluetooth™, IEEE 802.11b/g/n (or other WiFi standards), infrared data association (IrDa), and radiofrequency identification (RFID).

As used herein, upstream refers to the direction of data flow towards a host. For example, an upstream port on a hub is the port that is closest to the host (in a communication topology sense) and that generates upstream data traffic from the hub. As used herein, downstream refers to the direction of data flow away from a host. For example, a downstream port is the port on the hub that is furthest from the host (in a communication topology sense) and that generates downstream data traffic from the hub. For sake of clarity and conciseness, directional arrows should be understood as high-level data movement, e.g., single-direction arrows represent data flow from one module to another while bi-directional arrows represent two-way exchanges of data. However, skilled persons will recognize that low-level hardware implementations may be bi-directional when considering both the flow of a data request and an actual grant, thereby facilitating what is essentially a one-way data transfer.

Figure 2:
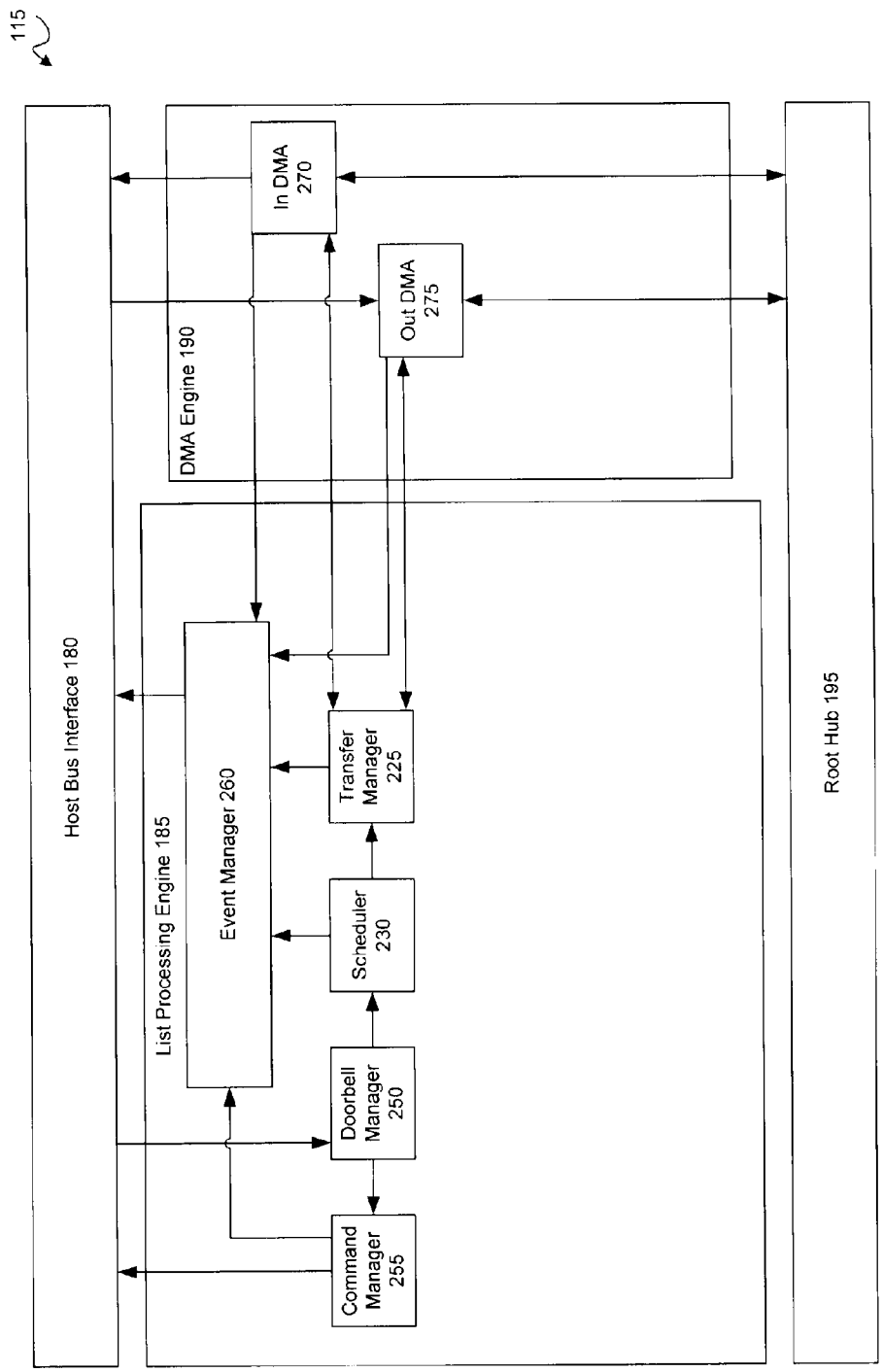
FIG. 2 is a block diagram illustrating functional modules in a host controller with interconnections that facilitate multi-threaded endpoint task processing, according to one embodiment.

FIG. 2 is a block diagram illustrating functional modules in the host controller 115 with interconnections that facilitate concurrent, i.e., multi-threaded, endpoint task processing, according to one embodiment. The host controller 115 comprises a list processing engine 185 having a plurality of functional modules interconnected to manage data transfer between a host bus and a root hub. The host bus interface 180 is configured to communicatively couple components of the host 110 (FIG. 1), such as the processor 120 and the memory 125, to the host controller 115 via the host bus 130. The root hub 195 is configured to communicate through a packet-based bus with one or more device endpoints. The plurality of functional modules includes a transfer manager 225 configured to determine what control data and/or data payloads should be transferred; a scheduler 230 to schedule actions performed by the transfer manager 225; and a DMA engine 190 designed to transfer data payloads between the host bus interface 180 and the root hub 195. The plurality of functional modules optionally includes a doorbell manager 250, a command manager 255, and an event manager 260.

The host bus interface 180 is configured to communicatively couple components of the host 110 (FIG. 1), such as the processor 120 and the memory 125, to the host controller 115 via the host bus 130. According to one embodiment, the host bus interface 180 is connected and configured to facilitate communication over the host bus 130 using the PCIe protocol. The host 110 (FIG. 1) may include a number of other components that interface with one another via the host bus 130, as described above in relation to FIG. 1.

To initiate data transfers to or from a target device (e.g., devices 141-145 in FIG. 1), system software, such as the USB class drivers 161, 162 or the OS 134 (FIG. 1), issues transaction requests to the host controller 115 via the host bus 130. For example, a USB keyboard driver may issue a transaction request that indicates how often the keyboard should be polled to determine if a user has pressed a key and supplies the location of a memory buffer into which data from the keyboard is stored. According to one embodiment, the host software issues a transaction request by generating or setting up a linked list or ring of data structures in system memory (e.g., the memory 125 in FIG. 1). To conserve the host memory 125, the host software driver may store the transaction data in discrete segments located in a circularly linked list, or transfer ring. The transfer ring of data structures may include one or more transfer request blocks (TRBs). Individual transfer request blocks may include one or more fields specifying, for example, the device address, the type of transaction (e.g., read or write), the transfer size, the speed at which the transaction should be sent, and the location in memory of the data buffer (e.g., where data from the device should be written or where data destined for the device can be read from). After the host memory 125 is set up, the host software notifies the doorbell manager 250 by writing data to a doorbell register, thereby causing the doorbell manager 250 to alert the scheduler 230 and the transfer manager 225 that an endpoint needs servicing. The scheduler 230 and the transfer manager 225 then work together to create and prioritize tasks that are sent to the DMA engine 190 where data is moved between the host 115 and devices.

According to the example embodiment of FIG. 2, the root hub 195 is directly attached to or embedded in the host controller 115. As depicted in FIG. 1, the root hub 195 includes one or more root ports, such as root ports 135, 140 (FIG. 1). The root hub 195 provides much of the same functionality as an externally connected hub, such as the hub 145 (FIG. 1); however, the root hub 195 is integrated within the host controller 115, and the hardware and software interfaces between the root hub 195 and the host controller 115 are defined by a specific hardware implementation. The root hub 195 routes transactions and any associated data from the host 110 to an appropriate buffer for an associated port. The appropriate buffer depends on the devices connected to a port, whether the transaction protocol is a USB 1.x, 2.0, or 3.0, and whether the transaction is a periodic or asynchronous transfer. For example, if the device to which the transaction relates is connected to the port 135 and the transaction involves a high-speed asynchronous transaction, the transaction and any associated data is routed by the root hub 195 into an asynchronous buffer associated with the port 135.

After the host software driver sets up a transaction requests, the scheduler 230 determines the order in which the transaction requests (or endpoint tasks) are dispatched. For each service opportunity, the scheduler 230 determines which transaction request to process. The scheduler 230 manages the sequence of pending endpoint tasks and develops the sequence with a priority scheme or through a round robin scheme. The scheduler 230 then provides the transfer manager 225 the unique identifier of the transaction request, thereby requesting the transfer manager 225 service the scheduled endpoint task. In addition, the scheduler 230 provides the transfer manager 225 processing information including the endpoint buffer burst size, maximum packet size, etc. Additional details regarding the scheduler 230 are described in U.S. Patent Application No. 61/446,913 filed on an even date herewith, entitled "Method and Apparatus for Scheduling Transactions in a Host-Controlled Packet-Based Bus Environment," naming Christopher Michael Meyers as the inventor, which is hereby incorporated by reference in its entirety.

The scheduler 230 determines when the host controller 115 will move data between the host 120 and the device, while the transfer manager 225 determines what control data and/or data payloads to transfer. The phrase "control data and/or data payloads" means control data alone, data payloads alone, or both together in any combination. The transfer manager 225 also determines where the transferable data is stored in the host memory 125, whether the data should be transferred via the USB 3.0 protocol or the USB 2.0/1.x protocol, the speed at which the data should be transferred (e.g., low-speed, full-speed, high-speed, or super-speed), whether the transaction includes a split transaction, whether an endpoint is in a flow control state indicating its internal buffers are full, and whether an endpoint is awaiting a response indicating any new scheduled task should be paused. When the transfer manager 225 receives a transaction request from the scheduler 230, the transfer manager 225 reads an internal context memory location, or endpoint profile, that defines the nature of the transaction request. The context memory location contains a pointer to a host memory location that the host software driver previously configured, as previously discussed.

The transfer manager 225 facilitates concurrent processing of multiple threads, i.e., multiple endpoint transaction pipelines. For each service opportunity, the transfer manager 225 determines how much of a scheduled transaction to execute. Based on the scheduled transaction request and the available resources, the transfer manager 225 determines how many bytes in the TRB linked list the DMA engine 190 should move. For example, although the host software driver may request a transaction that is over one megabyte in size, the DMA engine 190 may be constrained by available resources and therefore capable of moving only some portion of the total transaction. The transfer manager 225 calculates the portion of the transaction request to move, interfaces with the host software driver to apportion the transaction, and provides the DMA engine 190 with the location and offset of the apportioned transaction. The transfer manager 225 processes the remaining portion of the transaction request by sequencing through the ring of TRBs and executing the individual TRBs by handing them off to DMA engine 190.

The DMA engine 190 pairs up individual transfer request blocks with any necessary data movement and passes the transaction identified by the transfer request block and any associated data to the root hub 195. According to the example embodiment illustrated in FIG. 2, the DMA engine 190 comprises an inbound DMA engine (In DMA) 270 for inbound data transfers, and an outbound DMA engine (Out DMA) 275 for outbound data transfers.

The host controller 115 may also include the optional command manager 255 and event manager 260. The event manager 260 logs various events from the functional modules, including events indicating that transaction requests are completed. When the host software issues commands to the host controller 115 and attached devices, the software rings the doorbell manager 250 with a command doorbell. The doorbell manager 250 decodes the doorbell and alerts the command manager 255 to suspend various functional modules (depending on the specific command as outlined in the xHCI specification command set). The command manager 255 then performs the command. For example, when software detects and enumerates a new endpoint, the host controller driver 167 queries the host controller 115 to obtain a slot, i.e., a device address assigned through a slot enable command. The USB driver 165 uses the control endpoint (EP 0) to query the description of the device through the host controller driver 167 and via the transfer manager 225. The USB driver 165 then notifies the associated class driver 161 or 162 that there is a device ready and waiting to be initialized. The USB host controller driver 167 then sends commands to notify the command manager 255 to configure an endpoint based on the query information. The command manager 255 receives a "Configure Endpoint" command and initializes all the functional modules' internal control memory profiles associated with the new endpoint.

Figure 3A:
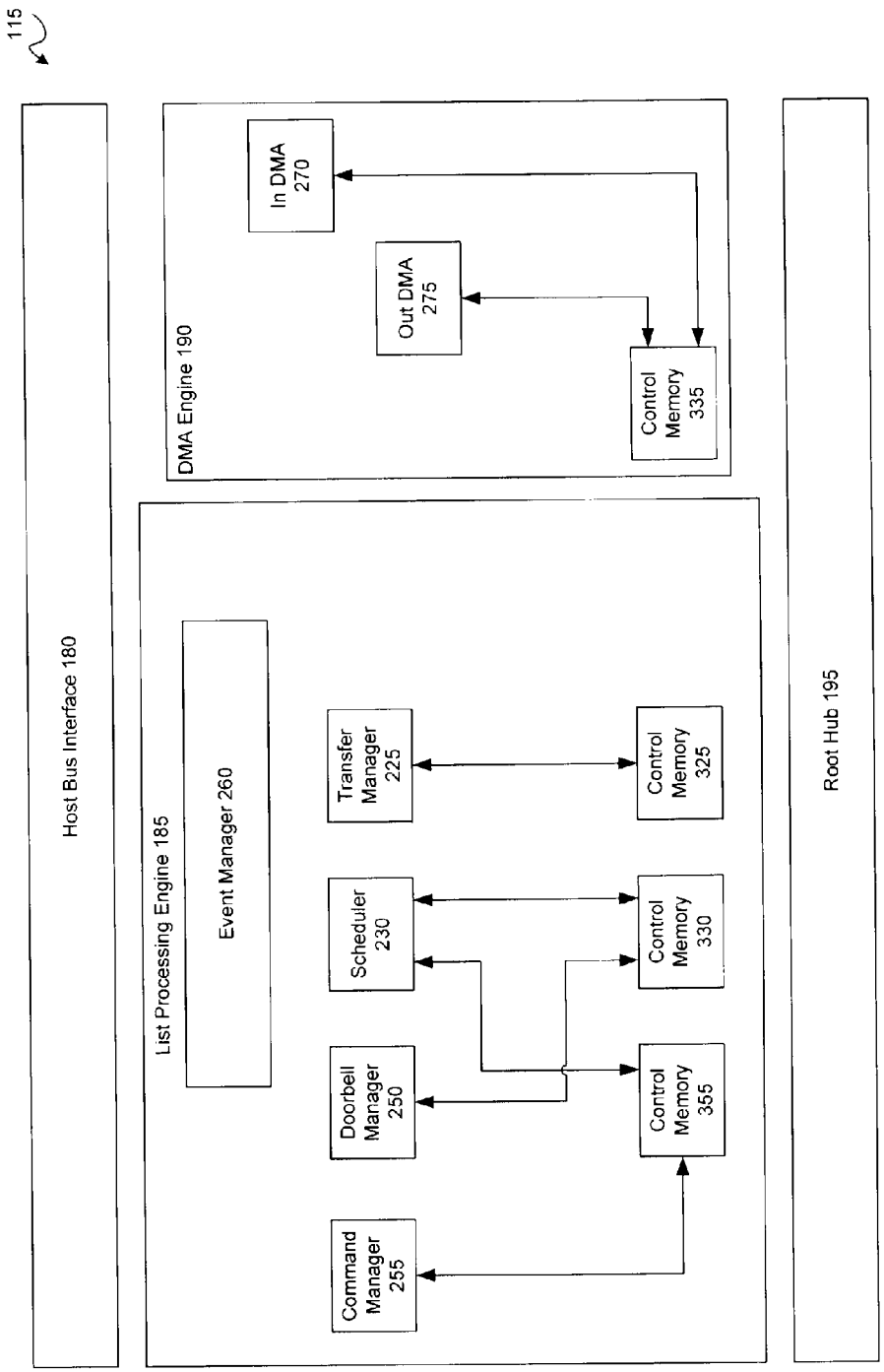
FIG. 3A is a block diagram illustrating control memories associated with the functional modules of FIG. 2, according to one embodiment.

FIG. 3A is a block diagram illustrating a plurality of context or control memories 325, 330, 335, 355 in the example host controller 115. Each control memory is associated with one or more of the functional modules. Specifically, the control memory 325 is associated with the transfer manager 225, the control memory 330 is associated with the scheduler 230 and the doorbell manager 250, the control memory 335 is associated with the In DMA 270 and the Out DMA 275 in the DMA engine 190, and the control memory 355 is associated with the command manager 255 and the scheduler 230. The control memories store state and/or data information fields that the associated functional module(s) access. The control memories are physically distinct within the host controller 115 and independently accessible from one another, i.e., each of the control memories occupies a physically separate memory segment within the host controller 115.

In the example host controller 115, some control memories are shared between two functional modules while other control memories are unshared. For example, a control memory 325 associated with the transfer manager 225 is configured to allow the transfer manager 225 to access the control memory 325 without contention from the other functional modules. Individually accessible control memories require more physical space inside host controller 115 than shared control memories; however, individually accessible control memories can provide faster access times for functional modules requiring fast or frequent access to associated control memory data. To reduce the footprint of the host controller 115, functional modules that do not require fast or frequent access may share a control memory. For example, a control memory 330 is shared between the scheduler 230 and the doorbell manager 250, and a control memory 335 is shared between the In DMA 270 and the Out DMA 275. The control memory 355 stores slot context data, as described in the xHCI specification, and thus includes connections to the command manager 255 and the scheduler 230. Shared control memories may include an internal or external control memory arbiter, or context controller, to facilitate sequential access to the memory when two or more functional modules request access at the same time.

Functional modules may occasionally require direct access to control memories that are primarily associated with other functional modules. For example, the DMA engine 190 may require access to the control memory 330 to update an error counter in the event of an error during transmission so that the scheduler 230 can monitor the error counter and change the endpoint task priority accordingly. Functional modules may access other functional modules' associated control memories when common data is shared between the functional modules and the access is infrequent, i.e., the access does not affect the performance path. In these circumstances, a dual port control memory or alternative memory-access implementation allows the DMA engine 190 to access the control memory 330.

Figure 3B:
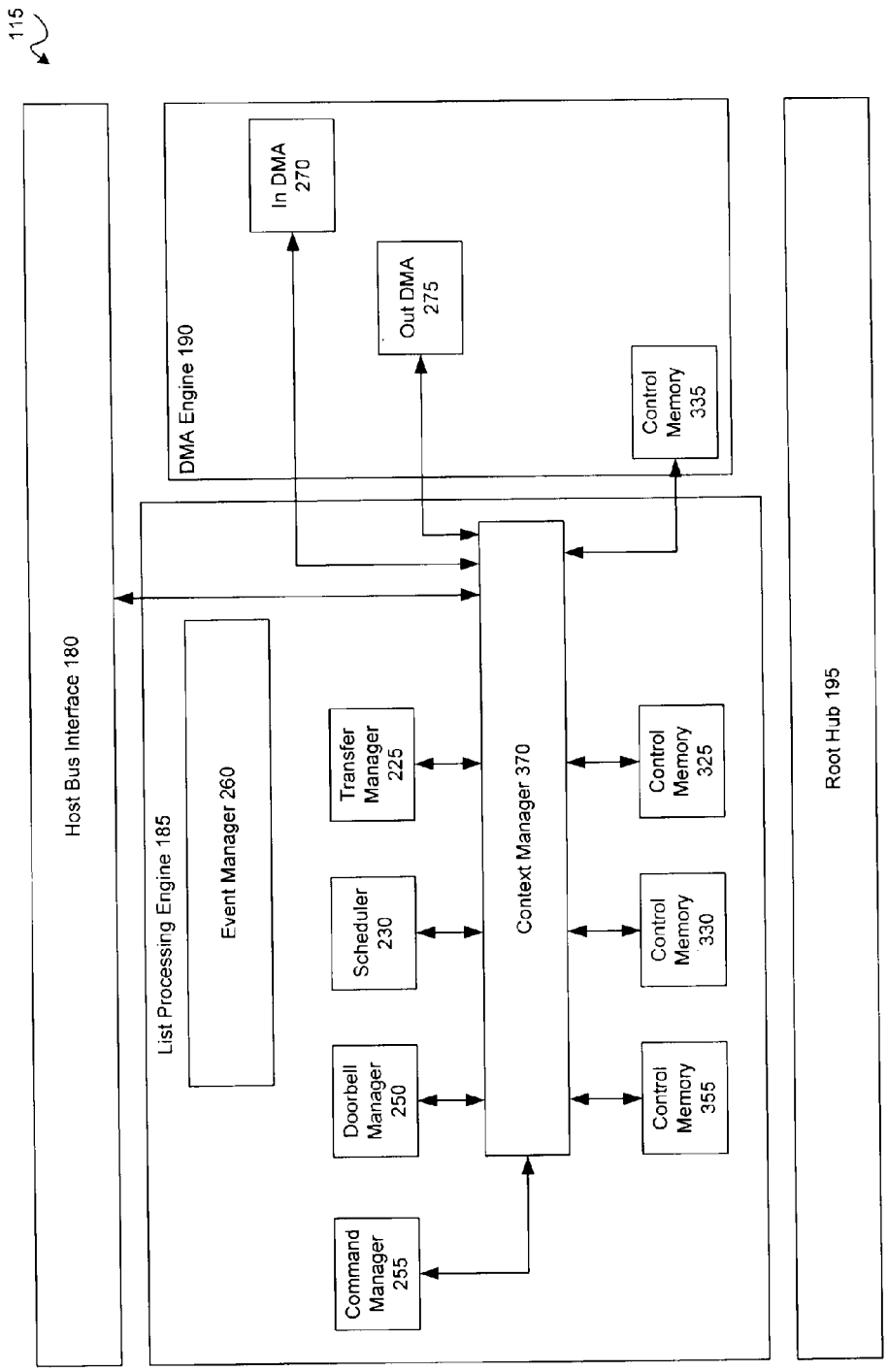
FIG. 3B is a block diagram illustrating control memories associated with the functional modules of FIG. 2, according to one embodiment.

FIG. 3B is a block diagram illustrating an alternative memory access structure including a context manager 370. To prevent data corruption, a context manager 370 provides read-modify-write access to data within the control memories 325, 330, 335, and 355. The context manager 370 allows functional modules to access an associated control memory, as in FIG. 3A, and provides infrequent access to alternative control memories as discussed above in the example of the DMA engine 190 accessing the control memory 330. When both shared and exclusive access control memories are implemented in the host controller 115, the context manager 370 may select the paths to memory for faster access as well as the paths that can share access. Additionally, the command manager 255 may access all control memories via the context manager 370, which may then program each endpoint data field whenever an endpoint is initialized or reconfigured. The context manager 370 also includes a connection to the host bus interface 180 for caching control memory data into the memory 125, as described in further detail below with reference to FIG. 6.

Skilled persons will recognize that the context manager 370 may provide an abstraction layer between the functional modules and the individual control memory banks, thereby allowing flexibility in the total number banks used in alternative embodiments. Furthermore, various exclusive access memory, shared memory, and context manager combinations are possible depending on whether particular embodiments' memory-access times affect data throughput performance. A subset of functional modules may require exclusive access to associated control memories while the remaining function modules may access memory via the context manager 370. For example, the transfer manager 225 may alternatively have exclusive access to the associated control memory 325 while the remaining functional modules access associated control memories via the context manager 370.

Figure 4:
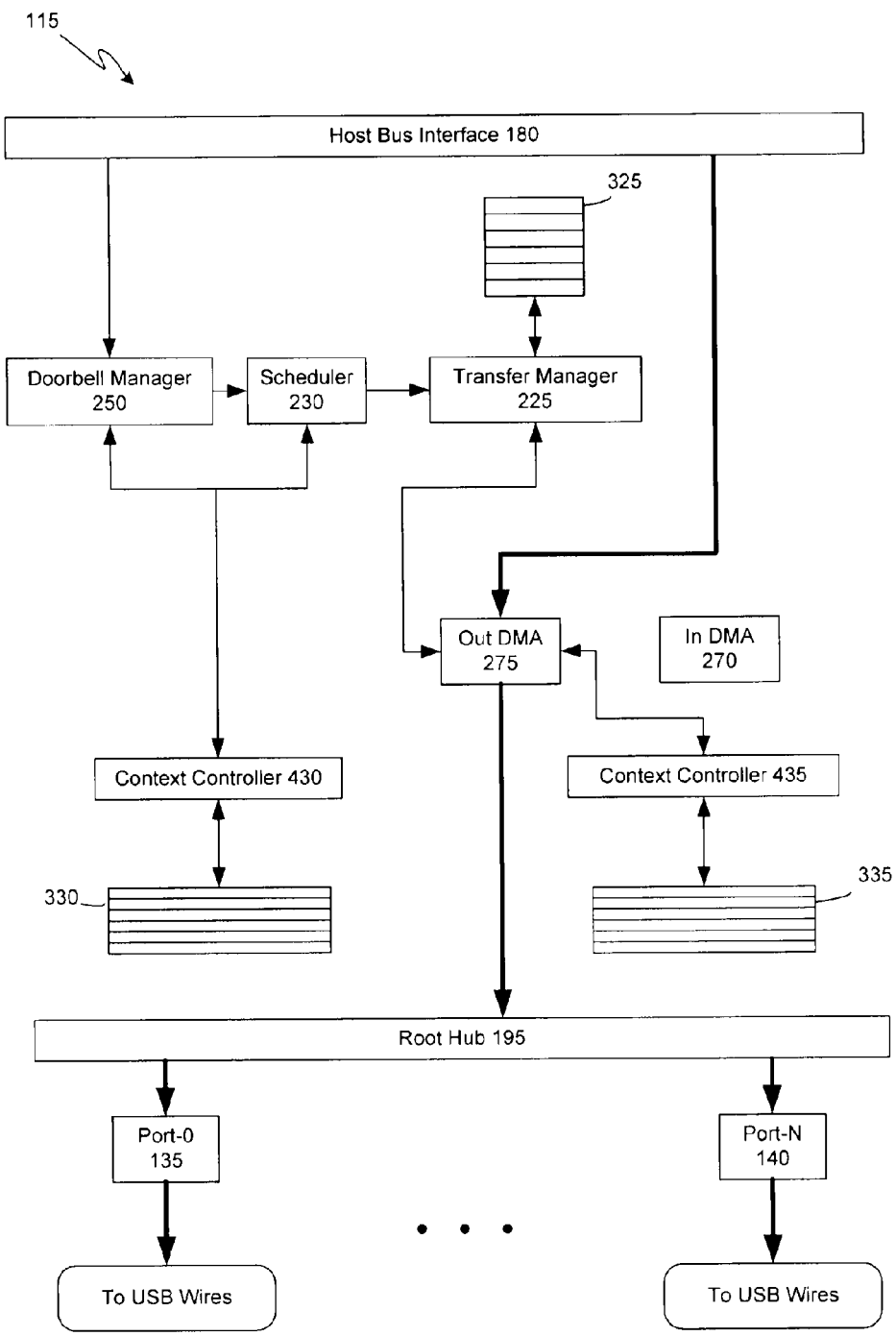
FIG. 4 is a block diagram to illustrate a sequence of data transfer processing tasks for providing data to a port from the host, according to one embodiment.

FIG. 4 is a block diagram of the same host controller 115 as in FIGS. 3A and 3B but augmented to illustrate a sequence of data transfer processing tasks for providing data to a port from a host (i.e., a downstream data transfer), according to one embodiment. For purposes of visual description, the heavier arrows indicate the general movement of payload data flow and control memory access that originates with the host and is transferred by the host controller functional modules to a port. The lighter arrows indicate the functional modules' read/write access of context data fields stored in internal control memories. Additionally, the In DMA 270 is not connected to the control memory 325 or the transfer manager 225 in FIG. 4. Nevertheless, it should be noted that connections are intended to illustrate payload data flow and control memory access during downstream transactions. Skilled persons will recognize that the Out DMA 275 receives data such as acknowledgement packets and other data as explained with reference to FIG. 15, below.

As discussed above, after the host software sets up a linked list or ring of data structure in system memory 125, the host controller driver 167 notifies the doorbell manager 250 by writing data to a doorbell register, thereby causing the doorbell manager 250 to alert the scheduler 230 and the transfer manager 225 that an endpoint needs servicing. The doorbell manager 250 updates the associated control memory 330 by storing the transaction endpoint task information and alerts the scheduler 230.

The scheduler 230 indexes the associated control memory 330 and assesses the priority of endpoint tasks. The scheduler 230 schedules the new transaction depending on the endpoint speed, the category of transaction (bulk transfer, control, interrupt, or isochronous), device requirements, available recourses, and other USB transaction traffic. The doorbell manager 250 shares access with the scheduler 230 because the doorbell manager 250 may update the endpoint state, changing the state from stopped to running. Because the doorbell manager 250 and scheduler 230 share access to the control memory 330, an external context controller 430 arbitrates access to the control memory 330. Alternatively, the context controller 430 may be included within the context manager 370 (FIG. 3B).

Once the scheduler 230 determines which endpoint task to process, the transfer manager 225 is alerted to begin processing or apportioning the scheduled task. The transfer manager 230 accesses the control memory 325 to determine where the transferrable data (or buffer to fill) is located in the memory 125 of the host 110. Each endpoint context field, or endpoint profile, within the internal control memory 325 contains a pointer to the memory containing the linked list of TRBs requiring transfer. The transfer manager 225 then allocates some portion of the transaction that is transferrable during a frame or microframe based on the available recourses, the size of the transfer, and the endpoint characteristics. To increase the efficiency of the host controller 115, the transfer manager 225 does not share access to the control memory 225. Therefore, the transfer manager 225 has an internal context controller to arbitrate its own access to the control memory 225. Control memory fields used by the transfer manager 225 are partitioned to support exclusive access, as further described with respect to FIG. 11.

The transfer manager alerts the Out DMA 275 to transfer the data from the memory 125. Alternatively, for transfers from a device endpoint into a buffer in the memory 125 (i.e., an upstream data transfer discussed with reference to FIG. 5), the transfer manager alerts the In DMA 270 to generate an IN Token and initiate a transfer from an endpoint to the memory 125 buffer. In either case, the DMA engines 270 and 275 receive an address of the data and an offset defining the size of the data block to transfer via the root hub 195 and ports 135 and 140. The DMA engines 270, 275 share an internal control memory 335 and therefore an external context controller 435 arbitrates access between the two DMA engines 270 and 275. Alternatively, the context controller 435 may also be included within the context manager 370 (FIG. 3B).

Figure 5:
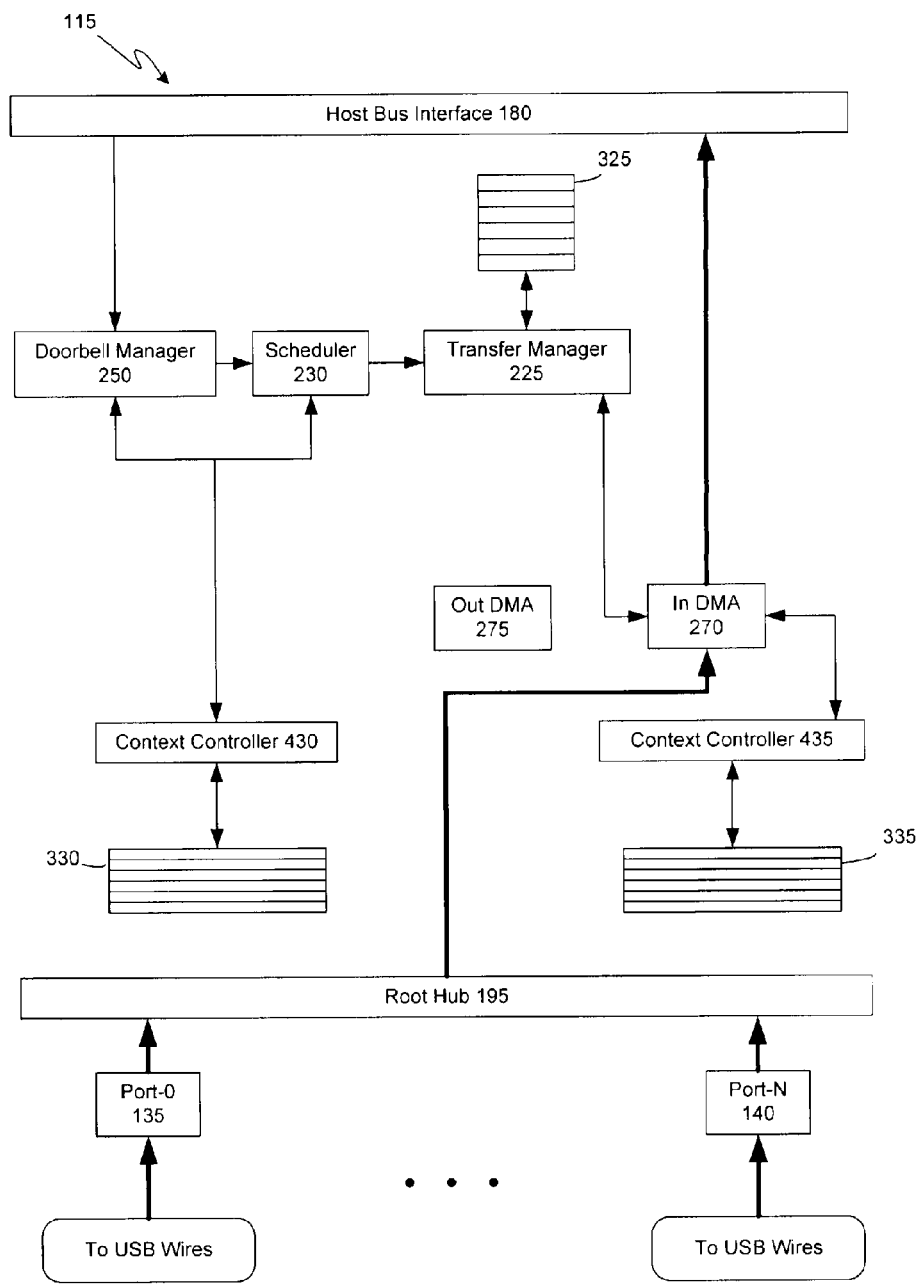
FIG. 5 is a block diagram to illustrate a sequence of data transfer processing tasks for delivering data from a port to the host, according to one embodiment.

FIG. 5 is a block diagram, like in FIG. 4, augmented to illustrate a sequence of data transfer processing tasks for providing data to a host from a port (i.e., a upstream data transfer) with the example host controller 115, according to one embodiment. The heavier lines in FIG. 5 indicate the general sequence of data processing and the direction of data movement that originates with a device, with the host controller functional modules transferring the data into host memory. Additionally, the Out DMA 275 is not connected to the control memory 325 or the transfer manager 225 in FIG. 5. Nevertheless, it should be noted that connections are intended to illustrate payload data flow and control memory access during upstream transactions. Skilled persons will recognize that the In DMA 270 transmits data such as tokens to initiate transactions and other data as explained with reference to FIG. 14, below.

After the In DMA 270 completes a transaction by moving data into the memory 125 (FIG. 1), the transfer manager 225 and scheduler 230 are alerted that a pool of resources from the DMA engine 190, port, or device are available. A hardware counter is implemented to represent the pool of resources as credits. Resources are referred to as a credits and the host controller 115 has a counter to keep track of the available credits. For example, a port packet buffer is counted as one credit, a remote device packet buffer is counted as one credit, and a local timeout timer is counted as one credit. The scheduler 230 checks the number of available credits before it provides the transfer manager 225 with the next task to process.

In the examples illustrated in FIGS. 4 and 5, the command manager 255 (FIG. 2) may include connections to the external context controllers 430 and 435 for performing software commands, e.g., initialization. Alternatively, the command manager 255 may rely on the functional modules to perform the memory access initiated by software commands. In another alternative embodiment, the command manager 255 may access individual control memories via a separate memory port. Other alternatives or combinations of alternatives are also possible.

Figure 6:
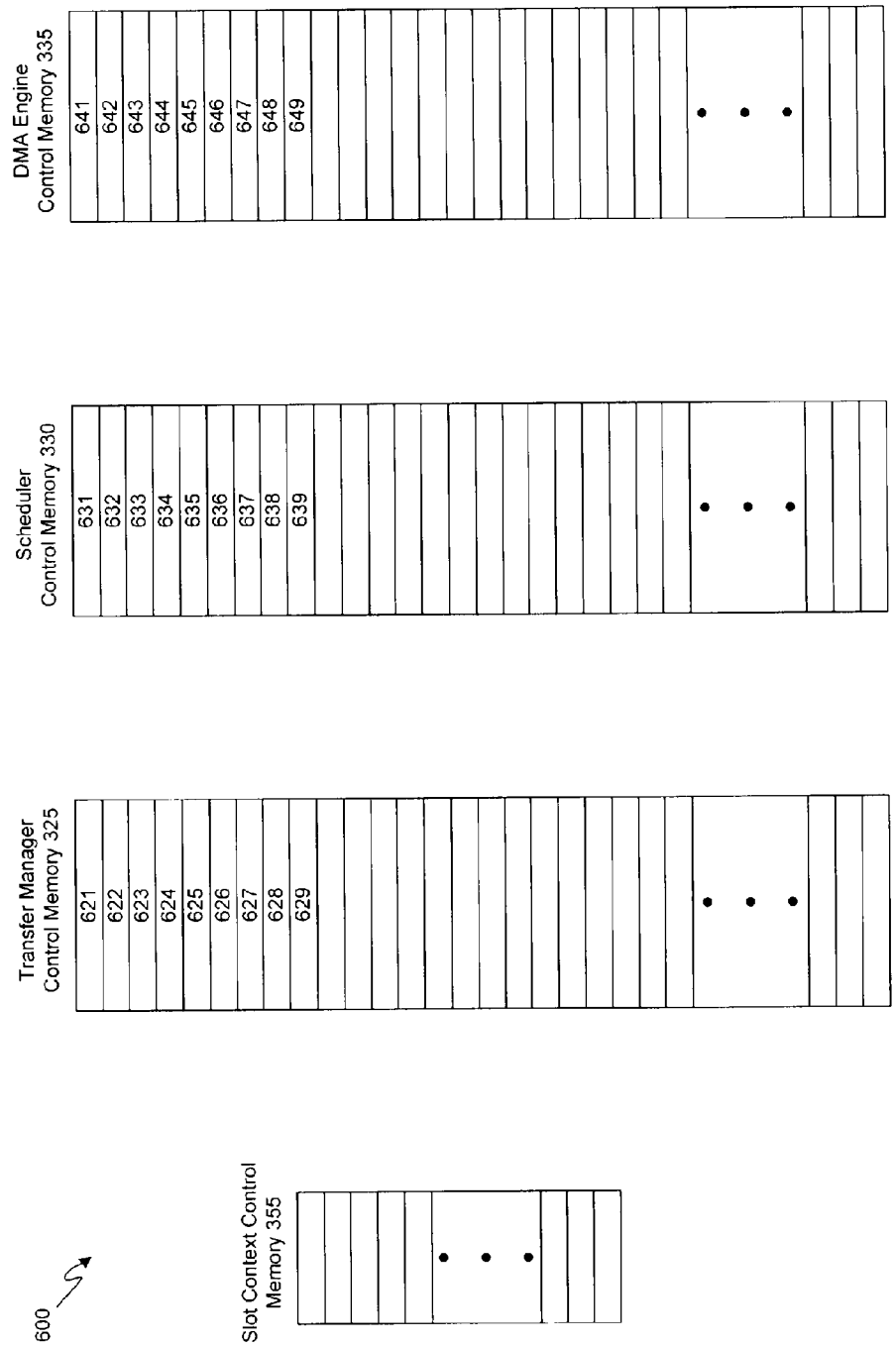
FIG. 6 is a memory allocation diagram depicting blocks of memory separately allocated for control memories, according to one embodiment.

FIG. 6 is an example memory allocation diagram 600 depicting blocks of memory that are physically separated and individually allocated for internal control memories within the host controller 115, according to one embodiment. With the exception of the control memory 355 (or slot context 355), the control memory row numbers, i.e., physical address locations in RAM within the host controller 115, contain data that collectively define an individual endpoint context. The slot context 355 row numbers correspond to individual devices, with each device capable of supporting multiple endpoints.

The example slot context 355 facilitates access to slot context data for active devices that the host controller 115 supports. The slot context 355 may, for example store 32 rows of data corresponding to 32 devices, although more devices are possible with larger memories. The slot context 355 is implemented as a register bank, accessible simultaneously by multiple functional modules. The slot context 355 supports access from the scheduler 230, the DMA engine 190, the doorbell manager 250, and the command manager 255 within the same clock cycle.

In the example memory allocation diagram 600, each individual control memory 325, 330, and 335 contains a portion of an endpoint context, with the portion accessible by an associated functional module. A group of rows 621, 631, and 641 contain data that corresponds to a first endpoint context; rows 622, 632, and 642 contain data that corresponds to a second endpoint context; etc. Nine different endpoints are initialized as indicated by rows 621-629 of the transfer manager control memory 325, rows 631-639 of the scheduler control memory 330, and rows 641-649 of the DMA engine control memory 335. Each endpoint context is split among the control memories 325, 330, and 335 such that each control memory contains data pertaining to the associated functional modules. Each control memory 325, 330, and 335 has, for example 64 rows of data accommodating 64 different active endpoint contexts, with the context manager 370 capable of swapping endpoint context data into the memory 125 to support additional active endpoints. The context manager 370 also implements the host controller 115 command interfaces by accessing each control memory 325, 330, and 335 to copy specified data fields and assemble an xHCI endpoint context data structure from among the control memories 325, 330, and 335 in response to software commands.

Associated functional modules use the endpoint context data to process a particular endpoint task. For example, the row 621 of the control memory 325 contains data fields allowing the transfer manager 225 to process a first endpoint transaction during a service interval, while the row 621 allows the transfer manager 225 to process a second endpoint transaction during a different service interval. The row 631 of the control memory 330 contains data fields allowing the scheduler 230 to process the first endpoint transaction during a service interval, while the row 632 allows the schedule to process the second endpoint transaction during a different service interval. Thus, during each service interval, each functional module can concurrently process a different endpoint task by accessing different rows in an associated control memory as discussed with reference to FIG. 7 below. To facilitate description, row locations (e.g., row 1, 2, 3, etc.) of the control memories 325, 330, and 335 are used synonymously with endpoint ID numbers.

Figure 7:
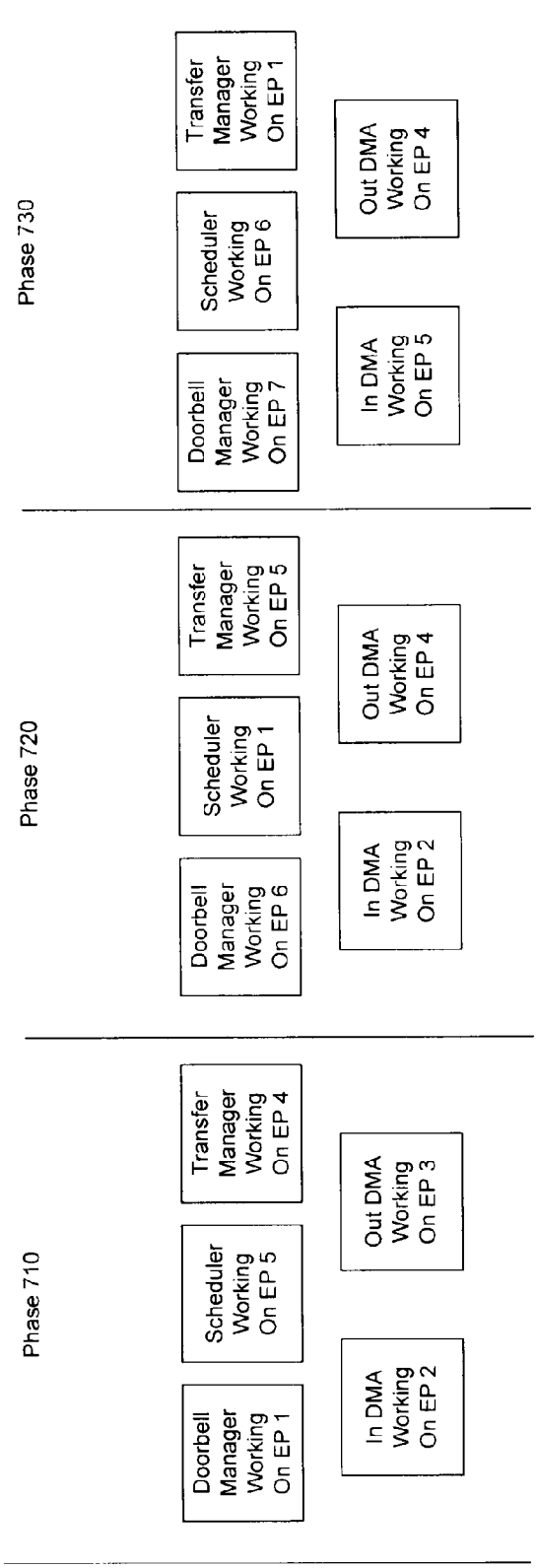
FIG. 7 is a modified timing diagram depicting functional modules performing multi-threaded endpoint task processing at different times, according to one embodiment.

FIG. 7 is a modified timing diagram depicting functional modules performing multi-threaded endpoint task processing at different times, according to one embodiment. During each phase, each functional module may access an associated control memory row and thereby process a different endpoint task. Thus, the host controller 115 may simultaneously operate different functional modules as different threads operating during at least some times to effectuate data transfer to or from different endpoints on the bus, such that multiple data transfer processing tasks are in progress simultaneously. In the example timing diagram, seven different endpoint tasks (from endpoint IDs 1-7) are processed during phases 710, 720, and 730.

During the phase 710, the doorbell manager 250 accesses the first row 631 of control memory 330, retrieves context data related to a first endpoint context, and processes the endpoint task associated with endpoint ID 1 (EP 1). Concurrently, during the same phase 710, the scheduler 230 attempts to access the fifth row 635 of the control memory 330. Because the doorbell manager 250 and scheduler 230 share access to the control memory 330, the external context controller 430 (FIG. 4) arbitrates access and allows one of the functional modules to read (or write) data in the control memory 330 while the other functional module waits. As discussed previously, if the doorbell manager 250 and scheduler 230 require frequent or fast access to the control memory 330, separate control memories may be provided. Also during the phase 710, the transfer manager 225 accesses the fourth row 624 of the control memory 325. When the In DMA 270 and the Out DMA 275 access the rows 642 and 643 (respectively) during the phase 710, the context controller 435 (FIG. 4) arbitrates access to the control memory 635. The context controller 435 prevents memory corruption by allowing one DMA engine to access the control memory 335 while the other DMA waits. Skilled persons will recognize that it is possible for the DMA engines 270 and 275 to have exclusive access to individual control memories; however, individual control memories are typically not required when the number of root hub ports is within the range of 2 to 8 ports.

During the subsequent phases 720 and 730, each functional module may switch endpoint tasks by accessing different rows in associated control memories. For example, if the scheduler 230 receives an alert from the doorbell manager 250 during the phase 710, then the scheduler 230 may begin to process EP 1 by accessing the row 631 during the phase 720, as shown. Similarly, the transfer manager 225 takes the scheduled EP 5 task from phase 710 and begins processing it by accessing the row 625 during the phase 720, as shown.

Because multiple endpoints may all require service, functional modules may process a single endpoint task during non-sequential phases. As an alternative example from that shown in FIG. 7, if the scheduler 230 partially processes an EP 5' data transfer processing task during a phase 710' and then receives an alert from the doorbell manager 250, the scheduler 230 may halt the partially completed EP 5' data transfer processing task and begin to process an EP 1' data transfer processing task by accessing the row 631 during a phase 720'. Because the partially processed EP 5' data transfer processing task requires additional processing from the scheduler 230, the scheduler 230 may then resume that task during a phase 730'.

In yet another alternative, the functional modules may continue processing the same endpoint tasks through multiple phases. As shown in the phases 710 and 720, the In DMA 270 processes tasks from the second endpoint (row 642) in multiple phases, which is also described below with respect to FIG. 8.

Figure 8:
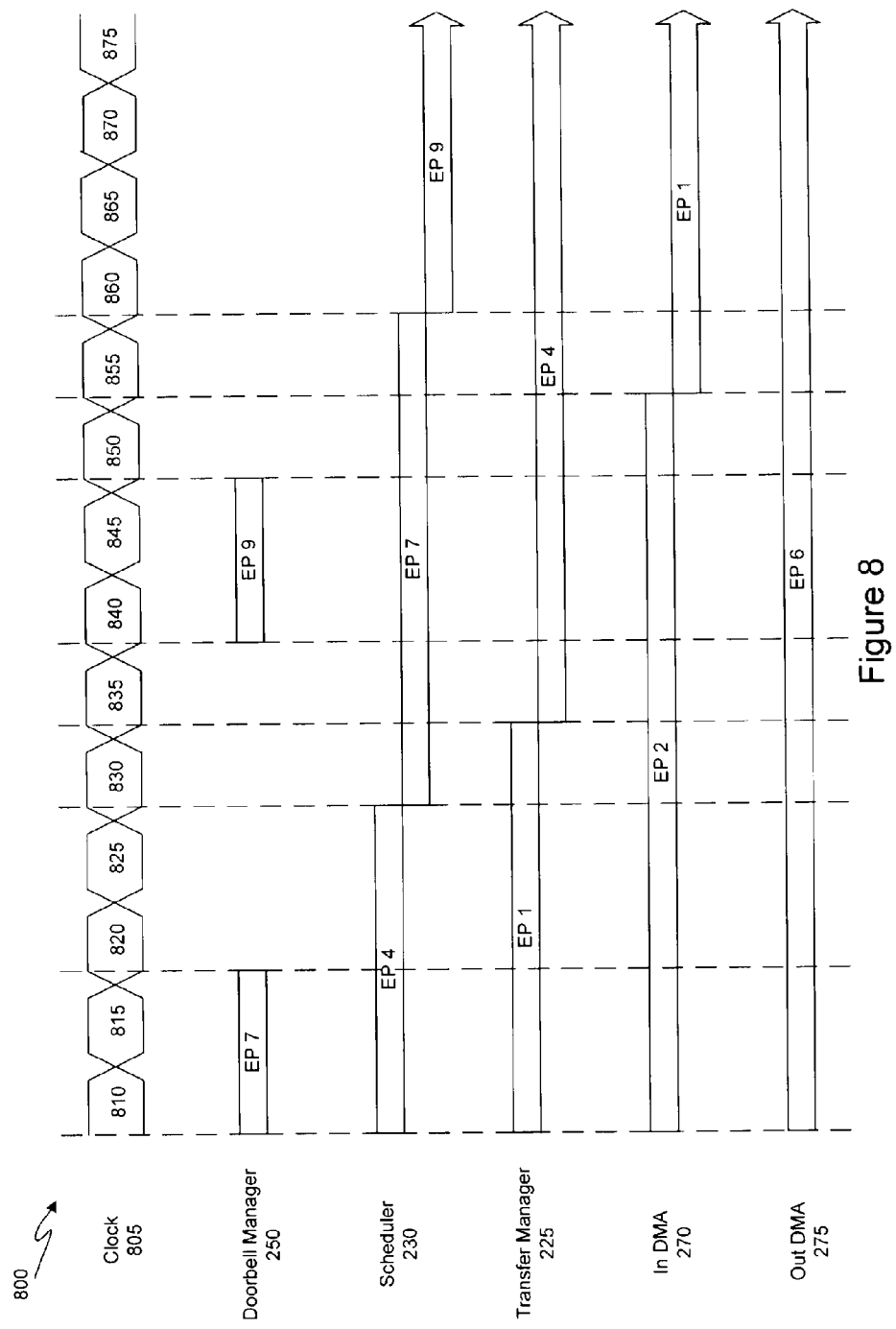
FIG. 8 is a modified timing diagram depicting functional modules performing multi-threaded endpoint task processing at different times, according to one embodiment.

FIG. 8 is another modified timing diagram depicting the functional modules processing endpoint tasks through multiple clock cycles of the host controller 115. In the example timing diagram 800, endpoint tasks may require varying number of clock cycles 805 for the different functional modules and the different complexities of the tasks. For example, if each clock cycle has a period of 125 nanoseconds, the doorbell manager 250 may require two clock cycles 810 and 815 to completely decode a doorbell alert from software indicating EP 7 has a transaction. Conversely, the Out DMA 275 processes a large data transfer throughout the clock cycles 810-875. During a third and fourth clock cycles 820 and 825, the scheduler 230 completely processes EP 4, the transfer manager 225 continues to process EP 1, and the In DMA 270 continues to process EP 2. During a fifth clock cycle 830, the scheduler 230 receives a notification from the doorbell manager 250 and begins processing the priority of EP 7. The transfer manager 225 completely processes EP 1 at the end of the fifth clock cycle 830, generating a notification to the In DMA 270. At the start of a sixth clock cycle 835, the transfer manager 225 switches to process EP 4 and continues to process that endpoint task through clock cycles 835-875. The doorbell manager 250 receives another doorbell and begins processing it during a seventh and eighth clock cycles 840 and 845. The In DMA 270 completes processing of EP 2 during a ninth clock cycle 850 and receives a notification from the transfer manager 225 to start processing EP 1 during a tenth clock cycle 855. The scheduler 230 completes processing of EP 7 during the tenth clock cycle 855, receives a notification from the doorbell manager 250 and begins processing EP 9 during the remaining clock cycles 860-875.

The previous description includes examples of functional modules with associated segmented control or context memories suitable for facilitating concurrent processing of multiple threads within each functional module. The following description pertains to implementation details of the functional modules and examples of control memory data fields, or data structures, used by the associated functional modules for achieving multi-threaded processing.

Figure 9:
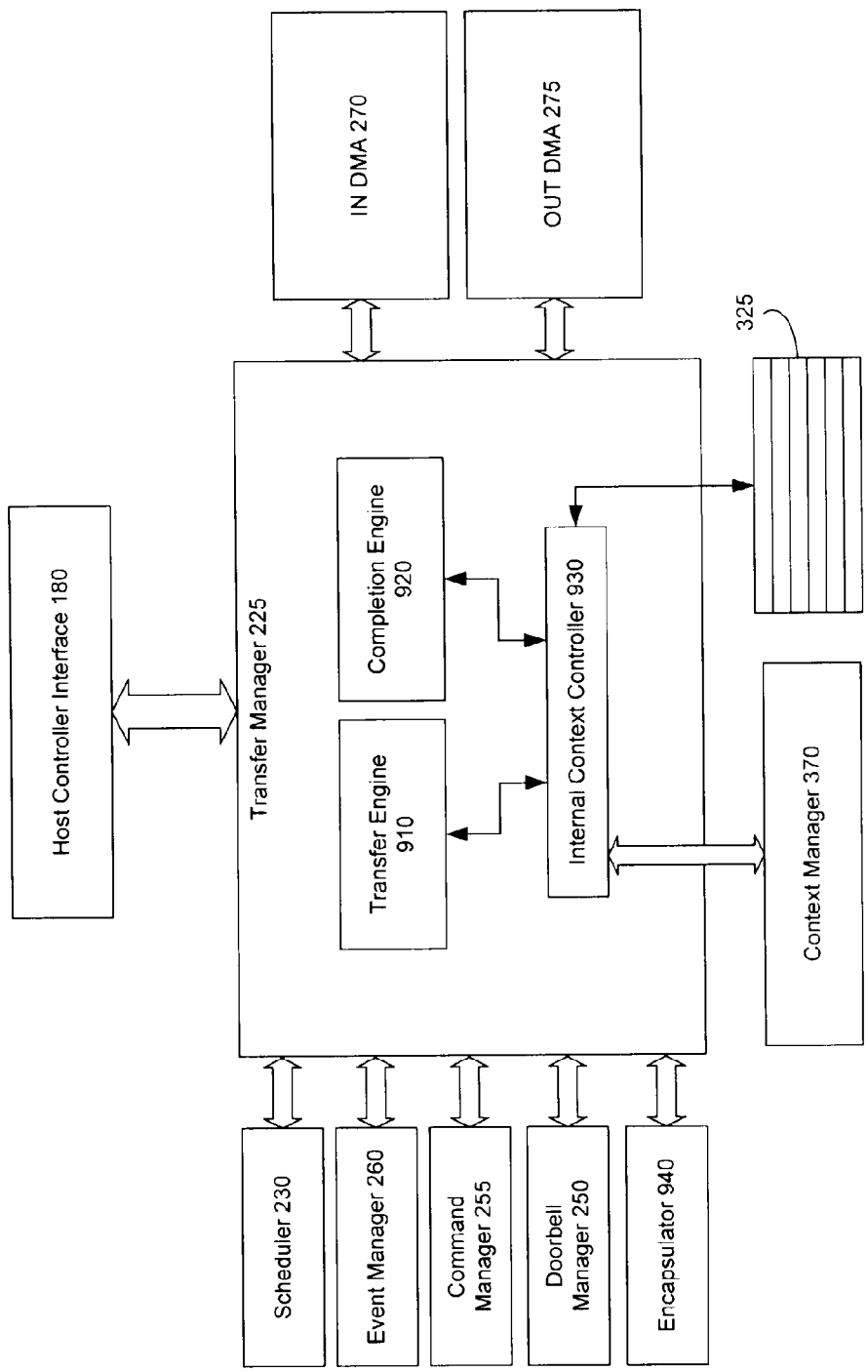
FIG. 9 is a block diagram of a transfer manager, according to one embodiment.

FIG. 9 is a block diagram of the transfer manager 225 and interfaces, according to one embodiment. The transfer manager 225 contains three sub-modules: a transfer engine 910 responsible for parsing the transfer rings and generating requests to the DMA engines 270 and 275; a completion engine 920 responsible for processing all received completed transactions; and an internal context controller 930 to arbitrate access to the shared internal control memory 325 between the transfer engine 910 and the completion engine 920.

The transfer engine 910 is configured to determine the amount of data to transfer in a service opportunity. After the transfer engine 910 fully executes or partially executes the transaction, the transfer engine 910 updates the data stored in one or more state fields within a row of the internal control memory 325 to reflect the state of the transaction. After a response related to the transaction is received from the downstream hub, the completion engine 920 is configured to update the data stored in one or more of the state fields to reflect the state of the transaction. For example, if a start-split transaction occurs for a split transaction, i.e., special high-speed transactions converted to low-speed or full-speed transactions, and a response comes back from the downstream hub that the start-split transaction was acknowledged, the completion engine 920 then updates the state information so that the stored state information moves from a start phase to a complete phase.

The transfer manager 225 interfaces with an encapsulator 940 that converts split transactions so that data can be transferred between the host 110 and downstream hubs at high-speed to low-speed or full-speed transactions. In addition to the encapsulator 940, the transfer manager 225 also includes other interfaces. The transfer manager 225 interfaces with the host bus interface 180 to access to the memory 125 for reading TRBs from transfer rings and for writing back a completion status through the event manager 260. The interface with the doorbell manager 250 allows clearing of a flow control state, e.g., device buffer overflow, and thus endpoints may be added back to the scheduler 230 list of running endpoints. The interfaces with the scheduler 230 provides two functions: one function allows the scheduler 230 to schedule an endpoint so that its TRBs are processed by the transfer manager 225; the other function notifies the scheduler 230 of flow control conditions, pending response conditions, and credit exhausted conditions so that the scheduler 230 skips endpoints with those these conditions. The interface to the event manager 260 provides for posting completion status (success or errors) of a transaction, which is also called posting events to the event ring. The event ring interface is translated by the event manager 260, which writes the events into the memory 125 at a pre-determined location. An interface with the command manager 255 allows the transfer manager 225 to transfer TRBs or packets initiated from the command manager 255 in response to driver generated commands or endpoints in error states.

Figure 10:
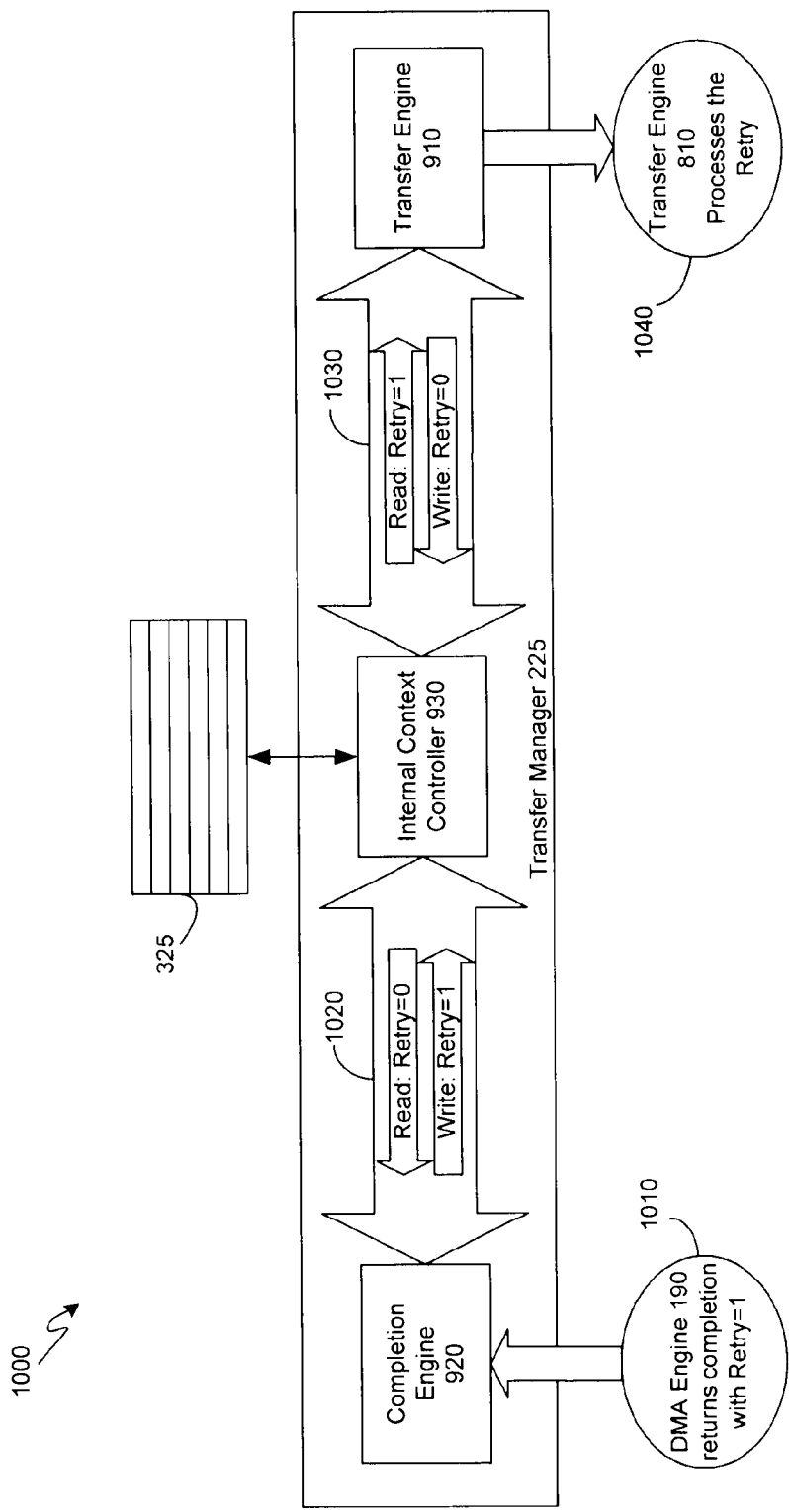
FIG. 10 is another block diagram depicting the transfer manager altering a retry flag within a control memory, according to one embodiment.

FIG. 10 is another block diagram of the transfer manager 225, depicting an example 1000 of the transfer engine 910 and completion engine 920 cooperatively altering a retry flag within a row of the control memory 325, according to one embodiment. The transfer engine 910 and the completion engine 920 operate independently with the transfer engine 910 processing endpoint tasks requested by the scheduler 230 and the completion engine 920 processing endpoint tasks sequentially based on the order in which completions are received from the ports 135 or 140. The transfer engine 910 and the completion engine 920 use the context data to pass status information between each other such that the control memory 325 is used to track the current progress on any given endpoint task. To coordinate the modification of endpoint context data, the transfer engine 910 and the completion engine 920 perform read-modify-writes of the control memory 325.

In the example 1000, at a step 1010 the DMA engine 190 returns a completion event indicating an unsuccessful transaction should be retried (Retry=1). After the completion engine 920 receives the completion event, the completion engine 920 attempts a read-modify-write at a step 1020. The internal context controller 930 receives the step 1020 read-modify-write command and performs the command whenever there is no contention from the transfer engine 910. The step 1020 read-modify-write command first reads that the Retry status flag for the endpoint task is set to a value of "0", then writes the updated value as a "1", and thereby modifies the endpoint context. The transfer engine 910 then may independently access the control memory 325 by attempting a read-modify-write at a step 1030. The internal context controller 930 receives the step 1030 read-modify-write command and performs the command while there is no contention from the completion engine 920. The step 1030 read-modify-write command first reads that the Retry status flag for the endpoint task is set to a value of "1", writes the updated value as a "0", which modifies the endpoint context, and then processes the retry at a step 1040.

FIGS. 11, 13, and 16 are tables of control memory fields describing example subsets of data used by the functional modules during multi-treaded endpoint task processing. Each table describes data fields that define a data structure stored within a row of a control memory, according to one embodiment. FIG. 11 corresponds to data in a row of the control memory 325, FIG. 13 corresponds to data in a row of the control memory 330, and FIG. 16 corresponds to data in a row of the control memory 335. The control memory fields allow each functional module to dynamically track a portion of an endpoint's state, i.e., context, of an endpoint. For example, the row 631 (FIG. 6), associated with the scheduler 230, contains a data structure with memory fields described by FIG. 13 and corresponding to a first endpoint. The scheduler 230 uses the state information in the row 631 to identify whether the first endpoint is running or stopped and thereby determines whether to schedule the endpoint for service. Additionally, other fields in the row 631 (and described with respect to FIG. 13, below) allow the scheduler 230 to predict the bandwidth consumption or indicate to the transfer manager 225 a maximum allowed transfer size. FIG. 17 is also a table that describes data fields that define a data structure stored within a row of the control memory 355; however, the data defines a slots' state, i.e., slot context. The table row numbers and the "Context Field" names are hereinafter used synonymously.

FIG. 11 is a table of control memory fields describing data used by the transfer manager 225, according to one embodiment. The example control memory fields listed by row correspond to a data structure that is stored within rows of the control memory 325. For example, the row 621 (FIG. 6) contains a data structure with memory fields described by FIG. 11 and corresponding to a first endpoint.

A row 1102 contains a description of a transfer dequeue pointer containing a memory address to a TRB within an endpoint's transfer ring in the memory 125. When the scheduler 230 schedules an endpoint for service, the transfer engine 910 processes the TRB identified by the transfer dequeue pointer 1102. Similarly, a row 1104 contains a description of a completion dequeue pointer to a TRB within an endpoint's transfer ring in the memory 125. The completion engine 920 updates the TRB identified by the completion dequeue pointer 1104 whenever it receives completion events, retry events, etc. As implemented in a PCIe bus, the transfer and completion dequeue pointers 1102 and 1104 are 60 bits due to the 60-bit PCIe bus addresses space.

A row 1110 contains a description of a transfer cycle bit to identify valid TRBs within the transfer ring in the memory 125. As explained in the xHCI specification, software on the host 110 uses a cycle bit in TRB data structures to mark the enqueue position of the transfer ring. For example, software initializes the TRB cycle bit within each TRB in the transfer ring, while the transfer cycle bit 1110 is also initialized to a corresponding value. When the host 110 software places valid data into a TRB data structure within the transfer ring, the TRB cycle bit is toggled to identify the valid TRB. The transfer engine 910 then compares the transfer cycle bit 1110 to the TRB cycle bit to identify a valid TRB. With circular TRB linked lists, the host 110 software alternates the value of the TRB cycle bits each time the transfer ring wraps, while the transfer engine 910 also toggles the transfer cycle bit 1110 each time it processes a link TRB type. After a TRB is completely processed, a completion cycle bit described in a row 1112 stores a value used to mark the completed TRB at the location identified by the completion dequeue pointer 1104. For example, the completion cycle bit 1112 may contain the identical value of the transfer cycle bit 1110 when the transfer engine 910 wraps, i.e., processes a link TRB, while the completion engine 920 lags behind.

A row 1120 describes a data buffer pointer that points to a location in the memory 125 for transmission or reception of transaction data. A row 1122 describes an offset, i.e., the amount of data in the data buffer that remains to be transferred or received. Rows 1120 and 1122 allow the transfer engine 910 to partially complete a TRB, update the amount completed in the row 1122, temporarily switch to process a different endpoint task TRB, and subsequently resume the partially completed TRB at the stored offset location. Upon switching between endpoint tasks, a row 1124 contains a TRB pending flag to identify whether a TRB has been completely transferred to the DMA engine and thus the transfer engine 910 should read a new TRB from the memory 125, or whether the transfer manager 225 should resume processing the current TRB. A row 1126 contains a counter with the total number of bytes transferred for a given transfer descriptor.

Rows 1130 and 1132 contain flags indicating whether data can be transferred to the device. The row 1130 indicates whether the device buffers are full and the row 1132 indicates whether the host controller 115 internal buffers are full. Rows 1140 and 1142 prevent buffer overflows caused from packet bursting. The row 1140 stores the number of packets in the endpoint buffer and the row 1142 stores the number of packets transmitted and not yet received. A row 1150 contains a flag indicating whether a control endpoint is transmitting or receiving data.

When device buffers overflow, a row 1160 contains a flow control flag indicating whether the transfer engine 910 should resend packets following a NYET response. Similarly, a row 1162 flag indicates whether packets should be resent following a NAK response.

For hardware flushing, a row 1170 contains data indicating an IN endpoint of a device has no more data to transfer and the remaining transfer descriptor should be flushed. A row 1172 contains data indicating that an endpoint is in an error state and the transfer engine 910 should flush the transfer.

According to the xHCI specification, the host controller 115 can read and write values of a TRB that is stored in the memory 125. For performance purposes, some data from the TRB may be cached in the control memory 325 and updated dynamically while the transfer manager 225 processes the TRB. Alternatively, the TRB in the memory 125 may be updated while the transfer manager 225 processes the TRB. Rows 1180-1188 contain an example set of data that may be cached in the control memory 325 or updated in the memory 125. The row 1180 contains the transfer length remaining, determined based on acknowledgements received from the endpoint. The value in the row 1180 counts down to zero as the endpoint acknowledges reception or transmission of data. The rows 1182-1188 correspond to the IOC bit, ISP bit, Chain bit, and TRB type in the xHCI specification. Skilled persons will recognize that depending on the data throughput requirements and the size of internal memory of the host controller 115, other sets of data in a TRB data structure may be updated on the memory 125.

Figure 12:
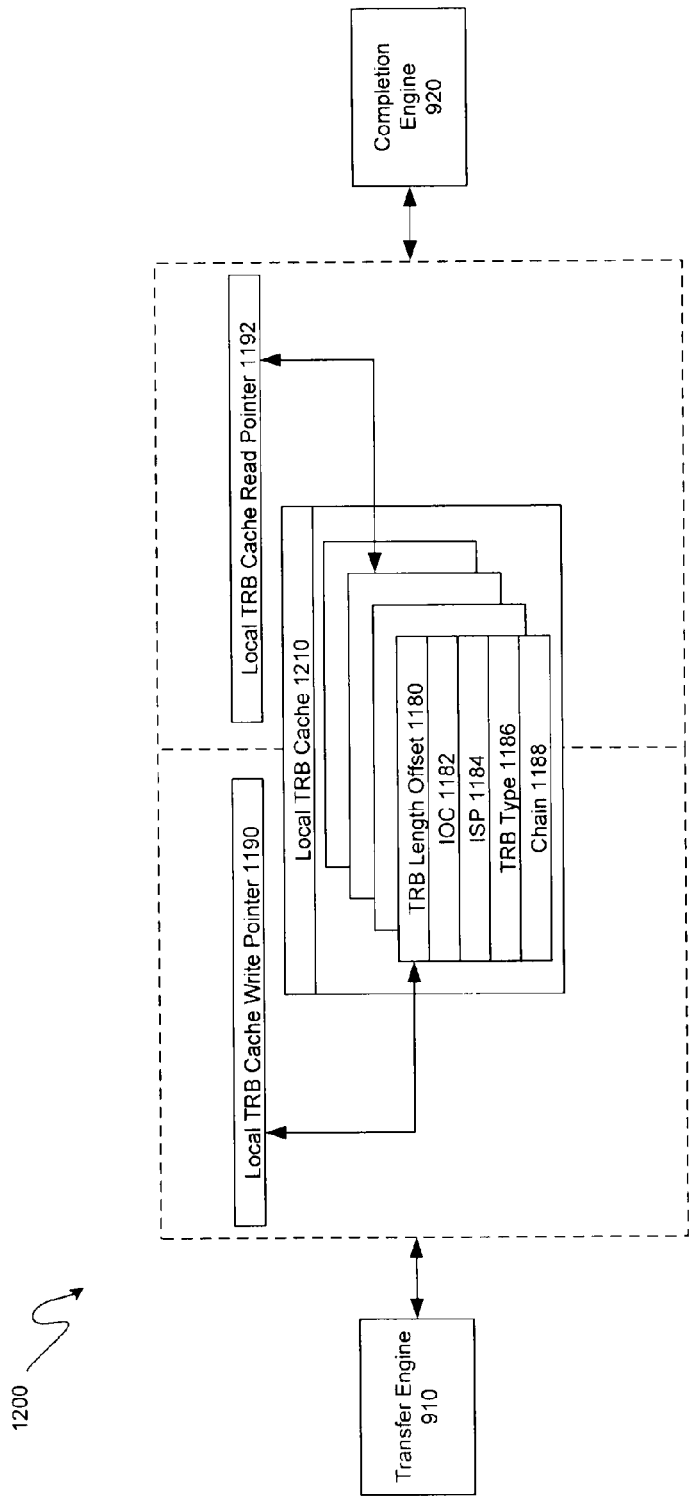
FIG. 12 is transfer request block cache module inside a host controller, according to one embodiment.

Rows 1180-1192 contain descriptions of fields used for TRB bursting as described in conjunction with FIG. 12, which depicts an example of a cache mechanism 1200 implemented in the control memory 325. A local TRB cache mechanism 1210 facilitates TRB burst operations. The local TRB cache 1210 for each endpoint stores sets of data corresponding to TRBs in the memory 125. The cached data in the local TRB cache 1210 allows the transfer engine 910 to burst the TRBs, which the completion engine 920 may then subsequently update upon receiving completion events. The data in the local TRB cache 1210 provides a full TRB pipeline for the DMA engines 270 and 275 and improves throughput over the host bus 130 and USB 112.

In the example cache mechanism 1200, local TRB cache write and read pointers 1190 and 1192 form head and tail pointers for the circular local TRB cache 1210. The local TRB cache 1210 contains four sets of data, or cache positions, corresponding to four TRBs. Each set of data contains TRB data specific to a single TRB, e.g., rows 1180-1188. When a new TRB is read from a transfer ring, the TRB length offset 1180, the IOC 1182, the ISP 1184, the TRB Type 1186, and the Chain 1188 data are cached into the local TRB cache 1210 at a position pointed to by the local TRB cache write pointer 1190, and other applicable TRB data is cached in rows 1110-1162. The transfer engine 910 then uses the context data with the local TRB cache 1210 to processes the new TRB. After processing (i.e., the data buffer offset 1122 reaches zero), the local TRB cache write pointer 1190 is changed to the next available cache position, another TRB is cached, and rows 1110-1162 are updated to reflect the newly cached TRB. Concurrently, the local TRB cache read pointer 1192 points to the previous cache position to update the TRB length offset 1180 whenever completion events are received. When the TRB length offset 1180 reaches zero (or a short packet is received or an error case is detected) the local TRB cache read pointer 1192 changes and the previous cache position is freed for the local TRB cache write pointer 1190 to use for another new TRB.

FIG. 13 is a table of control memory fields describing data used by the scheduler 230 and the doorbell manager 250, according to one embodiment. The example control memory fields listed by row correspond to a data structure that is that is stored within rows of the control memory 330. While FIG. 11 generally includes data pertaining to TRB data structures, FIG. 13 generally includes data pertaining to endpoint context data structures. Rows 1302-1316 are an example set of fields described in the xHCI specification with respect to the endpoint context data structure. However, skilled persons will recognize that the bit-width of rows 1302-1316 departs from the xHCI specification whenever fewer bits may fully represent the xHCI data, or when additional bits may capture additional information (e.g., the error count 1308). For example, the row 1310 does not track the direction of an endpoint in the endpoint type because the direction is stored elsewhere and therefore the row 1310 contains two bits instead of the three bits in the xHCI specification. In addition, a row 1318 is an example of a field that is not included in the xHCI specification, but is nonetheless used by the scheduler 230. The row 1318 describes an internal delay time between asynchronous packets, and it is used to pace transmissions to asynchronous devices.

Figure 14:
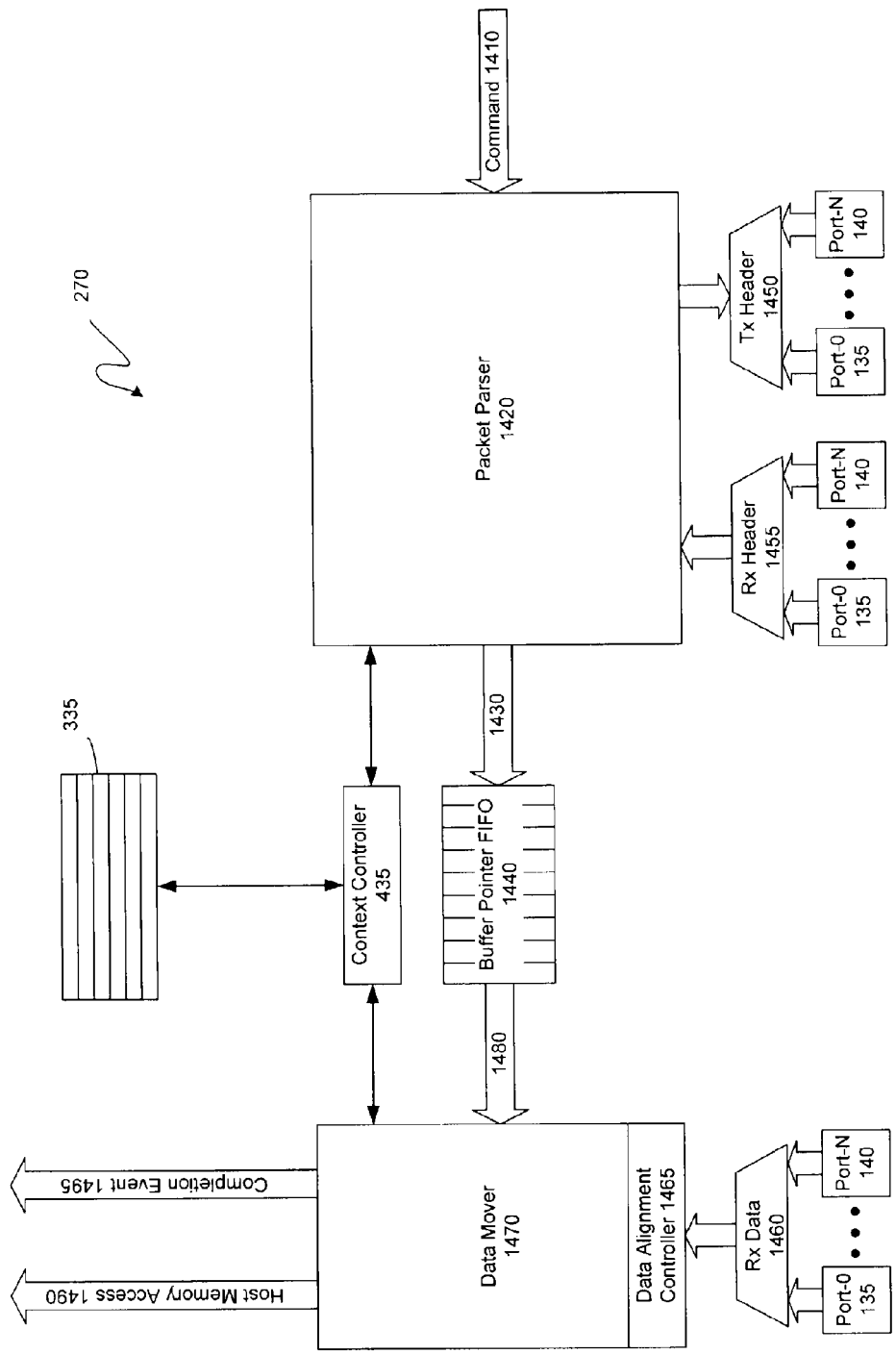
FIG. 14 is an In DMA engine for directly accessing host memory and delivering data from a root port to host memory, according to one embodiment.

FIG. 14 is an In DMA engine for directly accessing memory and delivering data from a root hub port to host memory, according to one embodiment. The In DMA 270 is associated with upstream transactions from IN endpoints, but it also handles other upstream transactions like device notification associated with IN, OUT, or Control endpoints. Alternatively, the In DMA 270 and the Out DMA 275 may selectively process device notifications or other upstream traffic depending on whichever engine is available to process the traffic. Skilled persons will recognize that the In DMA 270 receives data, but the In DMA 270 also transmits data, e.g., transmitting an IN Token packet to initiate receiving IN transactions, transmitting ACK packets after receiving a packet with payload data as defined by USB handshake protocol, etc.

In the example In DMA 270, a command 1410 from the transfer manager 225 initiates DMA data movement. The command 1410 includes a pointer to a buffer address in the memory 125 and an offset length for determining the size of the transaction. A packet parser 1420 receives the command 1410, places a buffer pointer 1430 into a buffer pointer FIFO 1440, issues a request to an endpoint via a transmit header port 1450, and updates the control memory 335 via the context controller 435. The packet parser then waits for packets to arrive from the endpoint. There may be multiple buffer pointer FIFOs, one for each root port, such that any packet received from any root port may be processed by the packet parser 1420 and thereby provide multi-threaded processing in the In DMA 270. When a data packet arrives, the packet parser 1420 separates packet header information with a receive header port 1455, while a receive data port 1460 buffers the incoming data. A data alignment controller 1465 prepares the buffered data for transmission over the host bus 130. A data mover 1470 updates the control memory 335 via the context controller 435, tracking that a packet was received from the endpoint. The data mover 1470 then moves the aligned data in the data alignment controller 1465 to a location in the memory 125 specified by a buffer pointer 1480, by using a host memory access connection 1490. A completion event 1495 is generated to alert the other functional modules that the In DMA 270 has moved data into the memory 125 and that there may be available credits. The In DMA 270 also handles packet timeouts. After an initiating packet transmitted by the In DMA 270, the In DMA 270 starts the timeout timer. If no return packet is received, the In DMA 270 initiates a completion event 1495.

Figure 15:
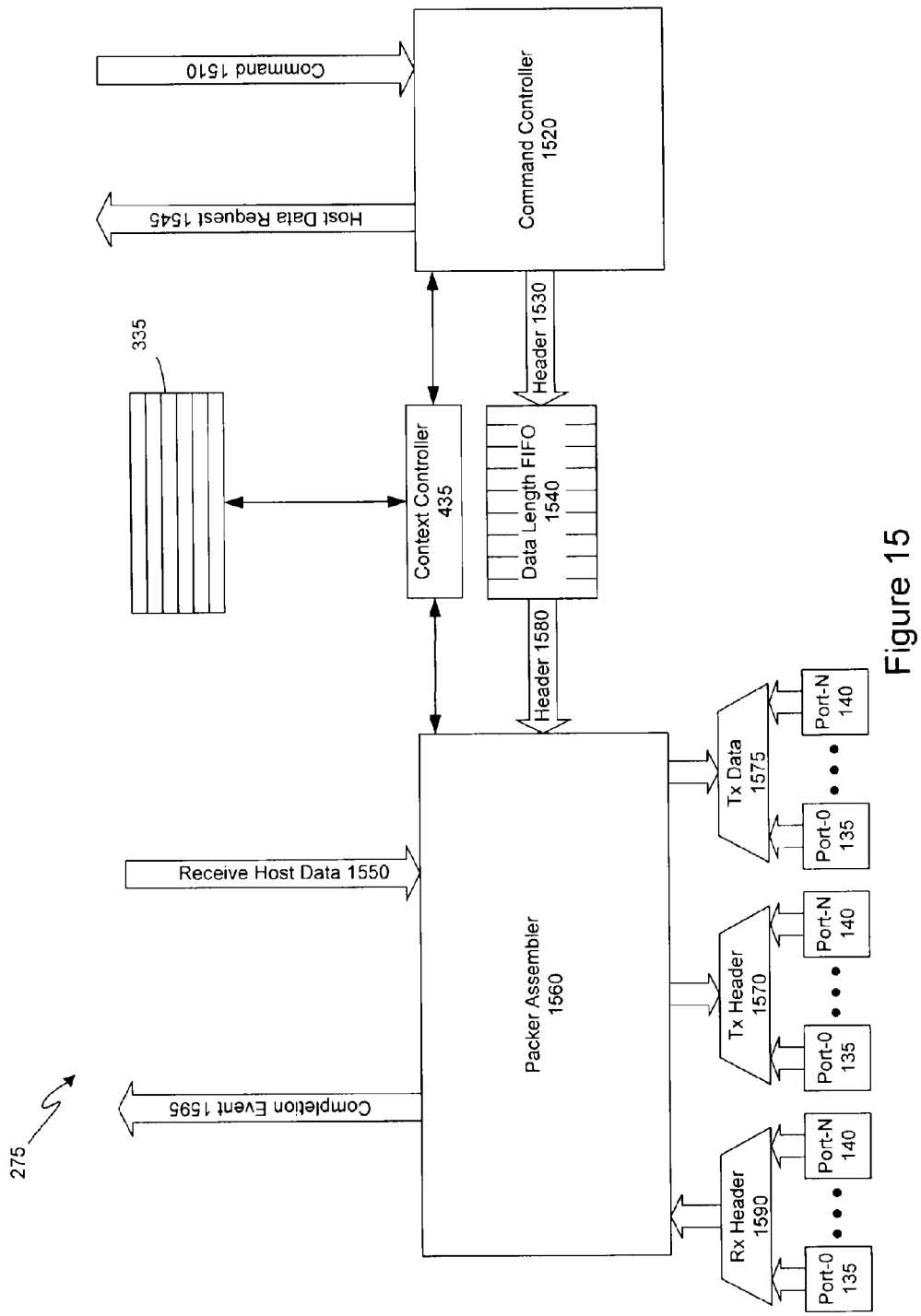
FIG. 15 is an Out DMA engine for directly accessing host memory and delivering data from host memory to the root port, according to one embodiment.

FIG. 15 is an Out DMA engine for directly accessing host memory and delivering data from host memory to the root hub port, according to one embodiment. The Out DMA 275 is associated with downstream transactions to OUT endpoints, but it also handles other downstream transactions like packets transmitted as result of a force header command, or address device commands, or for sending a timestamp packet. Alternatively, the In DMA 270 and the Out DMA 275 may selectively process other downstream transactions (traffic not associated with OUT endpoints) depending on whichever engine is available to process the other traffic. Skilled persons will recognize that the Out DMA 275 transmits data to the bus 112, but it also receives data, e.g. receiving acknowledgment responses, etc.

In the example Out DMA 275, a command 1510 from the transfer manager 225 initiates DMA data movement. The command 1510 includes a pointer to a buffer address in the memory 125 containing data to transmit, and an offset length for determining the size of the transaction. A command controller 1520 receives the command 1510, places a header 1530 containing the offset length into a data length FIFO 1540, issues a host data request 1545 to the host 110 via the host bus interface 180, and updates the control memory 335 via the context controller 435. The command controller 1520 then waits for data to arrive from the host 110. When host data 1550 is received, a packet assembler 1560 prepares packet header information for transmission via a transmit header port 1570, while a transmit data port 1575 buffers the incoming data 1550. After checking a header 1580 to verify the offset length of the data 1550, the packet assembler 1560 initiates the transaction by sending the prepared formed header packet, followed by the transaction data. After receiving an acknowledgement in a receive header port 1590, the packet assembler 1560 updates the control memory 335. A completion event 1595 is generated to alert the other functional modules that the Out DMA 275 has moved data from the memory 125 and that there may be available credits. The Out DMA 275 also manages the packet timeout function. When a packet has been sent, the Out DMA 275 starts a timer to track whether a proper acknowledgement has been received within a timeout period. If timeout period elapses prior to the Out DMA 275 receiving an ACK packet, the Out DMA 275 will generated a completion event 1595.

FIG. 16 is a table of control memory fields describing data used by the DMA engine 190, according to one embodiment. The example control memory fields listed by row correspond to a data structure that is stored within rows of the control memory 335. The control memory fields allow the DMA engine 190 to dynamically track a portion of a state, i.e., context, of an endpoint. For example, the row 641 (FIG. 6) contains a data structure with memory fields described by FIG. 16 and corresponding to a first endpoint. Rows 1602 and 1604 store the transmitted and received sequence numbers to verify that sequential packets are each transferred in order. Sequence numbers are tracked so that when the DMA engine 190 switches between multiple endpoints, and subsequently receives acknowledgements from the previous endpoint, the DMA engine 190 can check the sequence to determine if the packets were all received, or received with an error. Similarly, a row 1608 stores the number of packets the transfer manager 225 has requested and the In DMA 270 should request from a device. The row 1608 is decremented following an ACK. A row 1610 contains a short packet field that identifies a short packet has been received along with the characteristics of the short packet. A row 1612 contains data indicating the DMA engine 190 has received a NRDY packet. Rows 1610 and 1612 provide error indications for handling error conditions on an endpoint. The rows 1610 and 1612 signal to the DMA engine 190 that commands from the transfer manager 225 should be flushed, until the endpoint error condition is resolved.

FIG. 17 is a table of control memory fields describing data used by the command manager 255 and the scheduler 230, according to one embodiment. The example control memory fields listed by row correspond to a data structure that is stored within rows of the control memory 355. The control memory fields allow the command manager 255 to dynamically track or assemble a slot context from the data stored in other control memories. Rows 1702-1716 are an example set of fields described in the xHCI specification with respect to the slot context data structure. However, skilled persons will recognize that the bit-width of rows 1702-1716 departs from the xHCI specification whenever fewer bits may fully represent the fields, or when additional bits may capture additional information (e.g., the root hub port number 1706). For example, the row 1710 does not track the device speed because the device speed is fully described with two bits.

The terms and descriptions used above are set forth by way of illustration only and are not meant as limitations. Skilled persons will recognize that many variations can be made to the details of the above-described embodiments without departing from the underlying principles of the invention. The scope of the invention should therefore be determined only by the following claims and their equivalents.

The invention claimed is:

1. A host controller for a bus, the host controller comprising:
    a plurality of functional modules interconnected to manage transfer of data between a host bus and a root hub configured to communicate with one or more USB device endpoints on the bus, the plurality of functional modules comprising a DMA engine to transfer one or more data payloads between the host bus and the root hub, a transfer manager configured to determine what control data and/or data payloads should be transferred, and a scheduler to schedule actions performed by the transfer manager; and
    a plurality of control memories, each control memory associated with one or more of the functional modules, each control memory storing state and/or data information fields to be accessed by its one or more associated functional modules, the plurality of control memories being distinct and independently accessible from one another, the plurality of control memories comprising a control memory for the transfer manager being configured to store all fields used by the transfer manager so that the transfer manager can access its control memory without contention from other functional modules.

2. A host controller according to claim 1, wherein the control memory for the transfer manager stores fields comprising:
   a cycle field to identify a valid transfer request block;
   a dequeue pointer field to identify a transfer request block to process; and
   a transfer request block pending field to track whether a task associated with a transfer request block has been completely transferred to the DMA engine.

3. A host controller according to claim 1, wherein the plurality of control memories further comprises a control memory for the DMA engine.

4. A host controller according to claim 3, wherein the control memory for the DMA engine stores fields comprising:
   a sequence number field to track a sequence of packets;
   a packet counter field to store a number representing a quantity of packets for the DMA engine to request; and
   an error state indicator field to indicate an error condition on a USB endpoint.

5. A host controller according to claim 3, wherein the control memory for the DMA engine is configured to store all fields used by the DMA engine so that the DMA engine can access its control memory without contention from other functional modules.

6. A host controller according to claim 1, wherein the DMA engine comprises an outbound DMA engine and an inbound DMA engine, the outbound and inbound DMA engines having control memories being separate from each other.

7. A host controller according to claim 1, wherein the plurality of control memories further comprises a control memory for the scheduler.

8. A host controller according to claim 7, wherein the control memory for the scheduler stores fields comprising:
   an endpoint state field to track an operational state of a USB endpoint;
   an endpoint type field for tracking a type of the USB endpoint;
   an interval field for tracking a period between consecutive requests to the USB endpoint; and
   endpoint buffer characterization fields defining a buffer capacity in the USB endpoint.

9. A host controller according to claim 7, wherein the plurality of functional modules further comprises a doorbell manager communicatively coupled to the scheduler and configured to accept outbound data transfers from the host.

10. A host controller according to claim 9, wherein the plurality of control memories further comprises a control memory for the doorbell manager.

11. A host controller according to claim 10, wherein the control memory for the doorbell manager and the control memory for the scheduler are the same memory shared between the scheduler and the doorbell manager.

12. A host controller according to claim 1, wherein the plurality of functional modules further comprises a command manager configured to register the USB device endpoints.

13. A host controller according to claim 1, wherein the bus is a USB bus.

14. A host controller according to claim 13, wherein the host controller is an xHCI controller.

15. A host controller according to claim 1, wherein each of the plurality of control memories is configured to store all fields used by its associated one or more functional modules.

16. A host controller for a host-controlled packet-based bus, the host controller comprising:
   a root hub including multiple ports, each port configured to communicate with a downstream device having one or more device endpoints on the bus;
   a plurality of functional modules interconnected to manage transfer of data between a host bus and the root hub, the plurality of functional modules comprising a DMA engine to transfer one or more data payloads between the host bus and the root hub, a transfer manager configured to determine what control data and/or data payloads should be transferred, and a scheduler to schedule actions performed by the transfer manager;
   a plurality of control memories, each control memory associated with one or more of the functional modules, each control memory storing state and/or data information fields to be accessed by its one or more associated functional modules, the plurality of control memories being distinct and independently accessible from one another; and
   a plurality of temporary control memories associated with the individual ports respectively and configured to store information corresponding to contents of a header of a packet sent or received on the bus to/from its associated port, a temporary control memory lasting only about as long as needed to confirm receipt of its corresponding packet.

17. A multi-port xHCI host controller for a USB bus, the host controller comprising:
   a host bus interface having request and response interfaces to convey data between the multi-port xHCI host controller and a host;
   a command manager to control and initialize control memories within the multi-port xHCI host controller in response to commands initiated from software executing on the host;
   a doorbell manager to decode doorbell commands initiated from software executing on the host and to thereby initiate a pending task;
   a scheduler to prioritize all pending tasks and dispatch a priority task;
   a transfer manager to receive the priority task and to process the priority task by calculating an amount of data to transfer over the USB bus;
   a DMA engine for outbound data transfers to form packets for an endpoint on the USB bus and to move data from memory in the host through the USB bus and to the endpoint;
   a DMA engine for inbound data transfers to extract data from the USB bus and to move data into memory in the host; and
   a root hub comprising a plurality of ports.

18. A method for managing multiple data transfers on a scheduled bus connecting a host and a plurality of endpoints, the method operable in a host controller having a plurality of functional modules that cooperate to control the data transfers, the method comprising:
   simultaneously operating different functional modules as different threads operating during at least some times to effectuate data transfer to or from different endpoints on the bus, such that multiple data transfer processing tasks are in progress simultaneously;

partially processing a first data transfer processing task in a given functional module, the first data transfer processing task associated with a first data transfer destined for a first endpoint;
halting the first data transfer processing task in the given functional module while the first data transfer processing task is partially complete;
during the halting, processing a second data transfer processing task in the given functional module, the second data transfer processing task associated with a second data transfer destined for a second endpoint; and
resuming the first data transfer processing task in the given functional module so as to complete said first data transfer processing task.

19. A host comprising:
a host bus;
a controller for an external bus, the controller comprising:
a plurality of functional modules interconnected to manage transfer of data between a host bus and a root hub configured to communicate with one or more USB device endpoints on the bus, the plurality of functional modules comprising a DMA engine to transfer one or more data payloads between the host bus and the root hub, a transfer manager configured to determine what control data and/or data payloads should be transferred, and a scheduler to schedule actions performed by the transfer manager; and
a plurality of control memories, each control memory associated with one or more of the functional modules, each control memory storing state and/or data information fields to be accessed by its one or more associated functional modules, the plurality of control memories being distinct and independently accessible from one another, the plurality of control memories comprising a control memory for the transfer manager being configured to store all fields used by the transfer manager so that the transfer manager can access its control memory without contention from other functional modules.

20. A host according to claim 19, wherein the host is a computer.

21. A host according to claim 19, wherein the host is an embedded system.

* * * * *